(12) United States Patent
Aiken et al.

(10) Patent No.: US 7,242,964 B1
(45) Date of Patent: Jul. 10, 2007

(54) SHAPING OF EM FIELD FOR TRANSMISSION TO MULTIPLE TERMINALS

(75) Inventors: Richard Thomas Aiken, Convent Station, NJ (US); Joe Huang, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 826 days.

(21) Appl. No.: 09/672,512

(22) Filed: Sep. 28, 2000

(51) Int. Cl.
*H04B 1/38* (2006.01)

(52) U.S. Cl. ............... 455/561; 455/562.1; 455/105; 455/108; 455/110; 455/114.2

(58) Field of Classification Search .............. 455/561, 455/562.1, 517, 277.1, 278.1, 25, 67.14, 455/436, 450, 403, 422.1, 277.2, 524, 101, 455/440; 370/320, 347; 343/797; 375/347; 342/361, 158

See application file for complete search history.

(56) References Cited

U.S. PATENT DOCUMENTS 5,181,040 A * 1/1993 Inoue et al. ............... 342/149

(Continued)

FOREIGN PATENT DOCUMENTS

EP          0 926 916        6/1999

(Continued)

OTHER PUBLICATIONS

European Patent Office Search Report, Application No. 0130303330.3-2411, The Hague, Feb. 28, 2002.

Primary Examiner—Joseph Feild
Assistant Examiner—David Q. Nguyen

(57) ABSTRACT

A method and apparatus for directing energy in a plurality of azimuth directions. The amount of energy directed in the azimuth direction of a mobile terminal is a function of the location and acceptable receive strength of at least two mobile terminals. The function is such that the strength of an EM field at the location of any of these two mobile terminals is at least as large as, but not significantly larger than, needed for that mobile terminal to acceptably receive the signal carried by the EM field. The amount of energy to be directed in the azimuth direction of a mobile terminal is arrived at by first determining for each one of the mobile terminals an EM field that would have to be generated for the mobile terminal in order to provide an acceptable receive strength thereat, the determining taking into account the strength, at the location of the mobile terminal, of EM fields previously determined for others of the mobile terminals. This determining is repeated until the EM fields determined for at least two of the mobile terminals provide an EM field strength for each of these two mobile terminals that is substantially equal to its adequate receive strength. This determining is repeated until the EM fields converge. The amount of energy is then determined based on the EM fields thus determined. After the EM fields converge, the composite EM field that has thus been arrived at is the aforementioned composite EM field whose strength at the location of any of the at least two mobile terminals is at least as large as, but not significantly larger than, needed for that mobile terminal to acceptably receive the signal. This saves system resources, reduces interference with other signals, and increases the number of signals that can be transmitted simultaneously, which results in an increase in capacity, and therefore in profitability of the wireless communication system.

18 Claims, 14 Drawing Sheets

U.S. PATENT DOCUMENTS

| | | | |
|---|---|---|---|
| 5,200,755 A * | 4/1993 | Matsuda et al. | 342/158 |
| 5,615,409 A * | 3/1997 | Forssen et al. | 455/440 |
| 6,104,935 A * | 8/2000 | Smith et al. | 455/562.1 |
| 6,188,913 B1 * | 2/2001 | Fukagawa et al. | 455/562.1 |
| 6,212,406 B1 * | 4/2001 | Keskitalo et al. | 455/562.1 |
| 6,330,460 B1 * | 12/2001 | Wong et al. | 455/562.1 |
| 2003/0073463 A1 * | 4/2003 | Shapira | 455/562 |

FOREIGN PATENT DOCUMENTS

| | | |
|---|---|---|
| WO | WO 98 33233 A | 7/1998 |

* cited by examiner

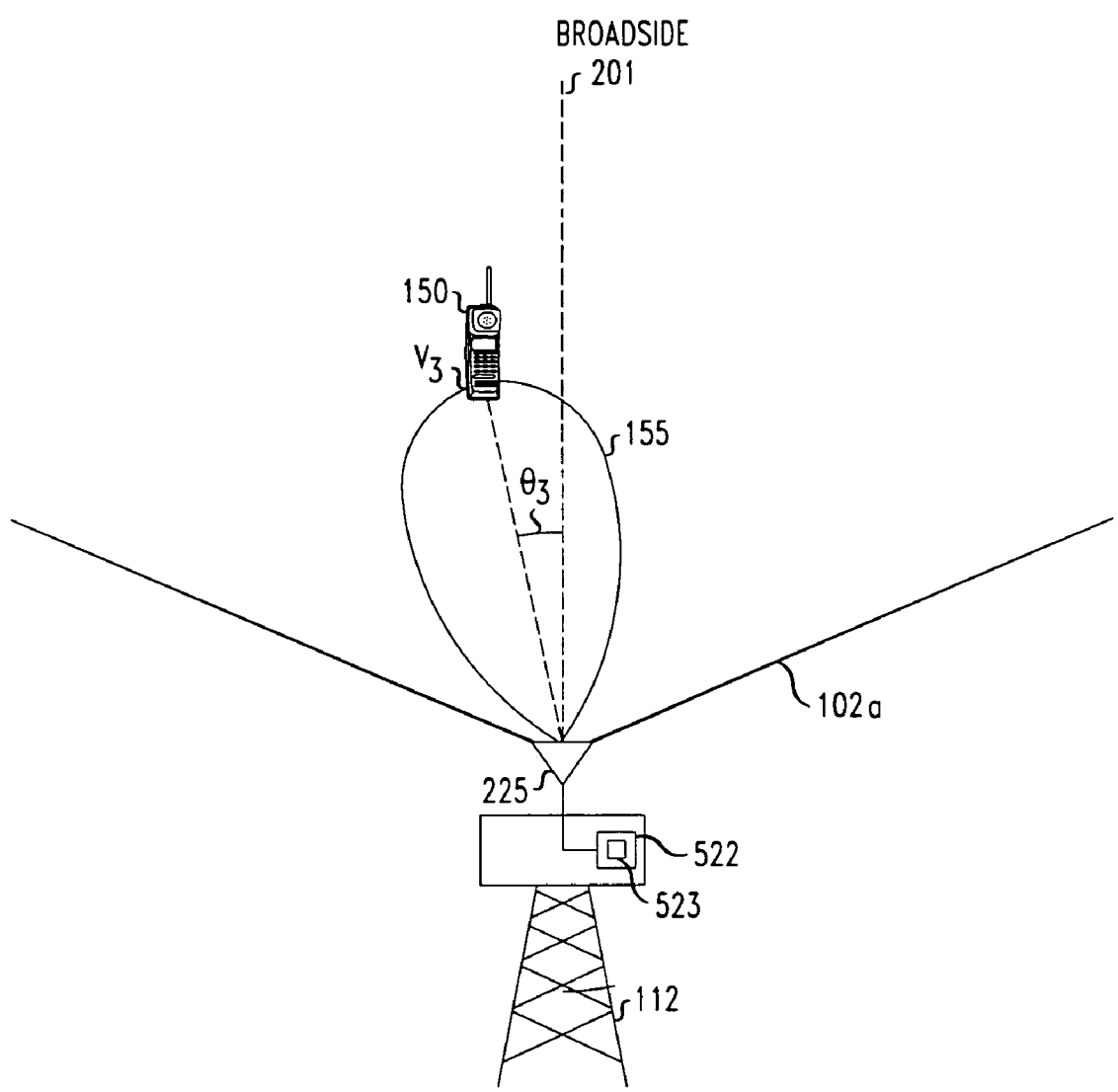

SHAPING OF EM FIELD FOR TRANSMISSION TO MULTIPLE TERMINALS

BACKGROUND OF THE INVENTION

This invention is related to communication systems, and more particularly to wireless communication systems.

A transmitter uses an antenna to transmit a signal to a receiver. For example, a transmitter in a so-called base station of a wireless communication system uses an antenna to transmit a signal to a mobile terminal. The antenna emits energy to generate an electromagnetic field (EM field) that carries the signal to the mobile terminal. A phased-array antenna, in particular, generates an EM field that is typically more focused than the EM field generated by a non-phased-array antenna. By a "more focused EM field" is meant an EM field where 1) the largest amount of energy is directed in a particular azimuth direction—for example, the azimuth direction of the mobile terminal to which the signal is being transmitted—, and 2) as the angle from the azimuth direction increases, the strength of this EM field drops off more sharply than the strength of the EM field that is not focused, such as an EM field generated by a non-phased array antenna. The azimuth direction is the angle of the mobile terminal from the broadside, the vertical plane perpendicular to the front face, of the phased-array antenna. Although it is actually the electromagnetic energy that is directed in a particular azimuth direction, for ease of reference it is the EM field that is referred to herein as being directed in the azimuth direction in which the largest amount of energy is directed.

Because the EM field generated by the phased-array antenna is more focused (also sometimes referred to in the art as being "narrower") than the EM field that would be generated by a non-phased array antenna, then, the signal carried by the EM field directed by the phased-array antenna to a particular mobile terminal interferes less with signals to other mobile terminals in the same, or other, so-called sectors of the cells of the wireless communication system than the signal carried by the EM field that would be generated by the non-phased-array antenna. This allows an increase in the number of mobile terminals in the wireless communication system, and therefore an increase in the capacity of the wireless communication system. (The capacity of the wireless communication system is the number of calls that can be carried simultaneously by the wireless communication system.)

The phased-array antenna should generate the EM field so that an acceptable receive voltage—the voltage received by the mobile terminal—is induced at the location of the mobile terminal. The acceptable receive voltage is that voltage necessary for the mobile terminal to receive the signal with an acceptable level of signal performance. Typically, power control information or quality-of-signal information, such as error information bits, received from the mobile terminal is used at the base station to adjust the EM field so that an acceptable receive voltage is induced at the location of the mobile terminal.

In a typical wireless communication system, signals transmitted for a number of mobile terminals are all transmitted at the same frequency. (For example, in a so-called TDMA wireless communication system, signals to three mobile terminals are transmitted on the same frequency.) Using a phased array antenna to transmit a signal on the same frequency to several mobile terminals could result in destructive interference of the EM fields directed to the several mobile terminals. Destructive interference occurs when an EM field directed to a first mobile terminal induces a secondary voltage at the location of a second mobile terminal, where this secondary voltage is out of phase with the primary voltage induced by the EM field directed to the second mobile terminal. In this case, the secondary voltage will reduce the magnitude of the primary voltage. This reduction in magnitude may be large enough so that the second mobile terminal may not receive an acceptable receive voltage, and therefore may not receive the signal with an acceptable level of signal quality.

It has been proposed to minimize the problems due to destructive interference by using focused EM fields having alternating orthogonal polarization, each EM field being directed in a fixed direction. The voltage induced at the location of a mobile terminal is induced by both the EM field whose direction is closest to the direction of the mobile terminal and by the all the other EM fields. However, since adjacent EM fields have orthogonal polarization, the possibility of destructive interference is reduced. This reduces the possibility that one of the mobile terminals will not acceptably receive the signal—receive the signal with an acceptable level of signal performance.

SUMMARY OF THE INVENTION

Although the above-described approach reduces the possibility that one of the mobile terminals will not acceptably receive a signal, the present inventors have realized that further improvement is possible. In particular, the present inventors have realized that the prior art does not take advantage of the fact that electromagnetic fields (EM fields) at the same frequency directed to various mobile terminals not only destructively interfere at locations throughout the sector, but also constructively interfere. Constructive interference occurs when an EM field directed to a first mobile terminal induces a secondary voltage at the location of a second mobile terminal, where this secondary voltage is in phase with the primary voltage induced by the EM field directed to the second mobile terminal. In this case, the magnitudes of the two voltages induced at the location of the second mobile terminal will add. In such a case, a smaller amount of energy can be induced at the second mobile terminal by the energy directed to the second mobile terminal than if the secondary voltage was not induced. This allows for a more efficient use of system resources.

In accordance with the invention, energy is directed in a plurality of directions, such as azimuth directions. The amount of energy directed in the azimuth direction of a terminal, such as a mobile terminal, is a function of the location and acceptable receive strength of at least two mobile terminals, where the acceptable receive strength of a mobile terminal is that EM field strength necessary for the mobile terminal to receive the signal with an acceptable level of signal performance. The function is such that the strength of the EM field at the location of any of these at least two mobile terminals is at least as large as, but not significantly larger than, needed for that mobile terminal to acceptably receive the signal carried by the EM field.

In an illustrative embodiment of the invention, the amount of energy to be directed in the azimuth direction of a mobile terminal is arrived at by first determining for each one of the mobile terminals an EM field that would have to be generated for the mobile terminal in order to provide an acceptable receive strength thereat, the determining taking into account the strength, at the location of the mobile terminal, of EM fields previously determined for others of the mobile terminals. This determining is repeated until the EM fields determined for at least two of the mobile terminals provide an EM field strength for each of these two mobile terminals that is substantially equal to its adequate receive strength, where the adequate receive strength is the substantially minimum acceptable receive strength.

The determining step is repeated until the EM fields converge, which is achieved when the changes between the determined EM fields and the previous iteration of the determined EM fields are small. The amount of energy to be directed in the azimuth direction of each of the terminals is then determined based on the EM fields thus determined.

After the EM fields converge, the composite EM field that has thus been arrived at is, indeed, the aforementioned EM field whose strength at the location of any of the at least two mobile terminals is at least as large as, but not significantly larger than, needed for that mobile terminal to acceptably receive the signal carried by the composite EM field. This saves system resources, reduces interference with other signals, and increases the number of signals that can be transmitted simultaneously, which results in an increase in capacity, and therefore an increase in profitability of the wireless communication system.

BRIEF DESCRIPTION OF THE DRAWINGS

FIG. 6a is a plot in the Cartesian coordinate system of a voltage beam-pattern representing the EM field of FIG. 2a;

FIG. 6b is a plot in the polar coordinate system of a voltage beam-pattern representing the EM field of FIG. 2a;

FIGS. 9a, 9b, and 9c show voltage beam-patterns that would be generated by the phased-array antenna of FIG. 5 to transmit a signal to just one of the mobile terminals;

DETAILED DESCRIPTION

Figure 1:
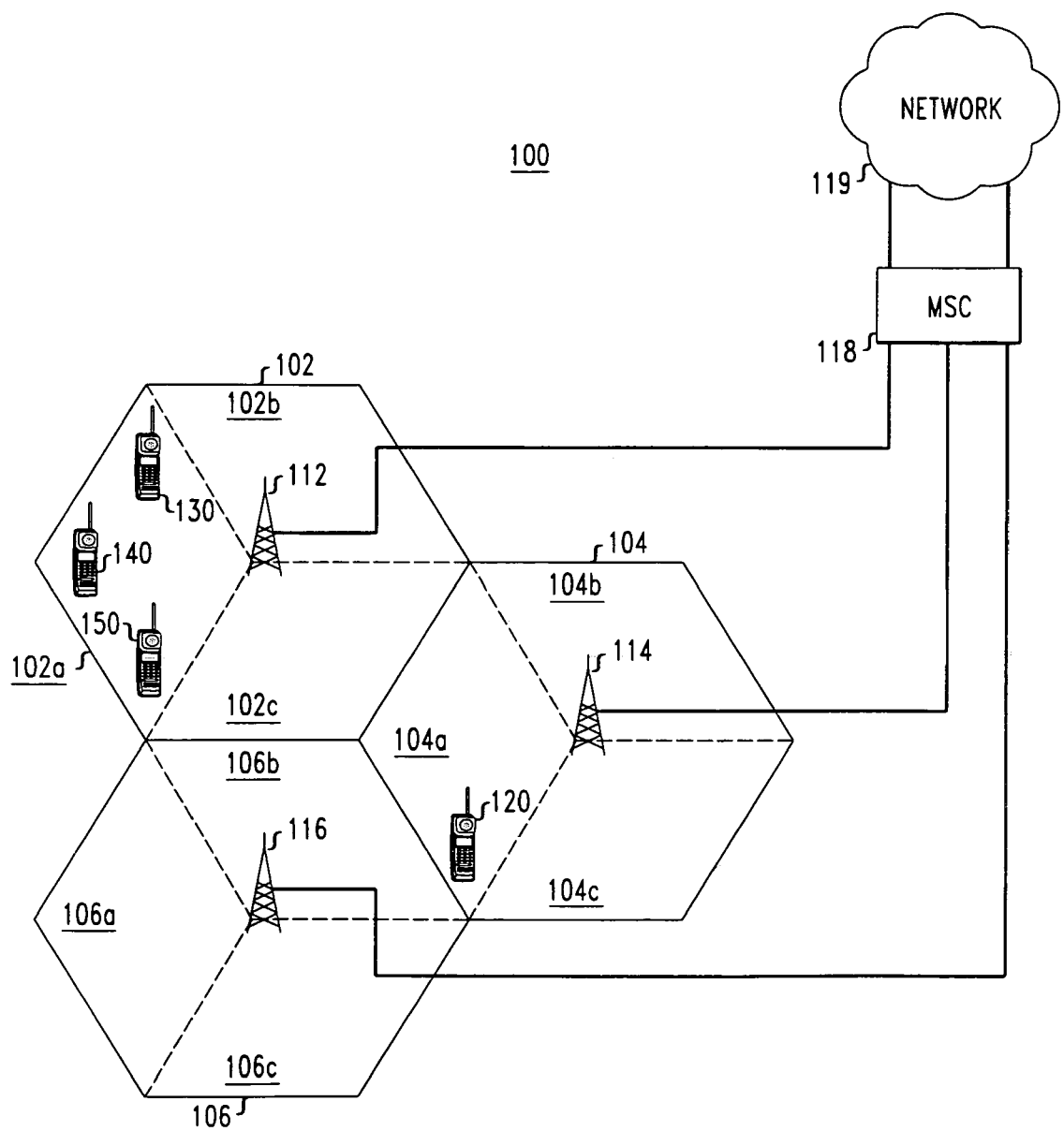
FIG. 1 is a block diagram of a portion of a wireless communication system.

Referring to FIG. 1, the geographic area serviced by a wireless communications system 100 is divided into a plurality of spatially distinct areas called "cells." For ease of analysis each cell 102, 104, and 106 is typically approximated and schematically represented by a hexagon in a honeycomb pattern. However, each cell is actually of an irregular shape that depends on the topography of the terrain surrounding the cell. Each cell 102, 104, 106 can be divided into a plurality of sectors, such as three 120° sectors. Cell 102 is divided into sectors 102a, 102b, and 102c; cell 104 is divided into sectors 104a, 104b, and 104c; and cell 106 is divided into sectors 106a, and 106b and 106c. Each cell 102, 104, 106 contains one base station 112, 114, 116, respectively, each of which includes equipment to communicate with Mobile Switching Center ("MSC") 118. MSC 118 is connected to local and/or long-distance transmission network 119, such as a public switched telephone network (PSTN). Each base station 112, 114, 116 also includes transmitters and antennas. Typically, each base station includes different transmitters and antennas for each sector that the base station serves. The base stations use the transmitters and antennas to communicate over an air interface with mobile terminals, such as mobile terminals 120, 130, 140, and 150.

Figure 2A:
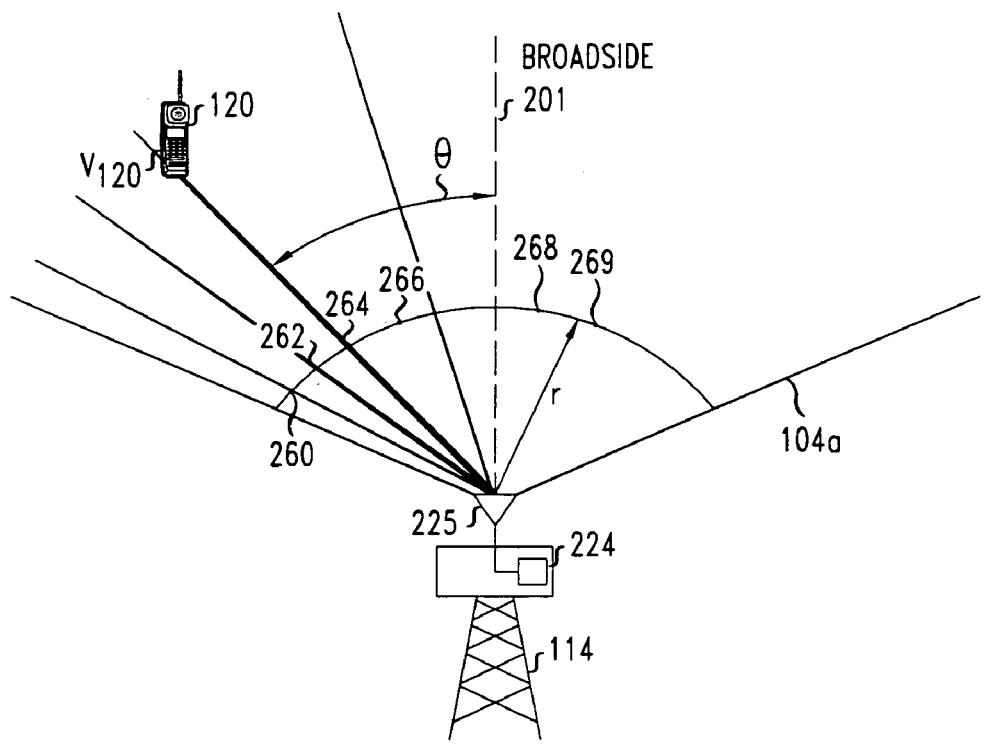
FIG. 2a shows a sector of the wireless communication system of FIG. 1, the sector containing a base station having a phased-array antenna transmitting a signal to one mobile terminal.

FIG. 2a shows sector 104a in more detail. Transmitter 224, in base station 114, uses phased-array antenna 225 to transmit a signal to mobile terminal 120. Phased-array antenna 225 emits energy to generate an electromagnetic field (EM field) that carries a signal to mobile terminal 120.

Phased-array antenna 225 should generate the EM field so that an acceptable receive voltage—the voltage received by the mobile terminal—, for example $V_{120}$, is induced at the location of the mobile terminal. The acceptable receive voltage is that voltage necessary for the mobile terminal to receive the signal with an acceptable level of signal performance. Typically, power control information or quality-of-signal information, such as error information bits, received from the mobile terminal is used at the base station to adjust the EM field so that an acceptable receive voltage is induced at the location of the mobile terminal.

Figure 2B:
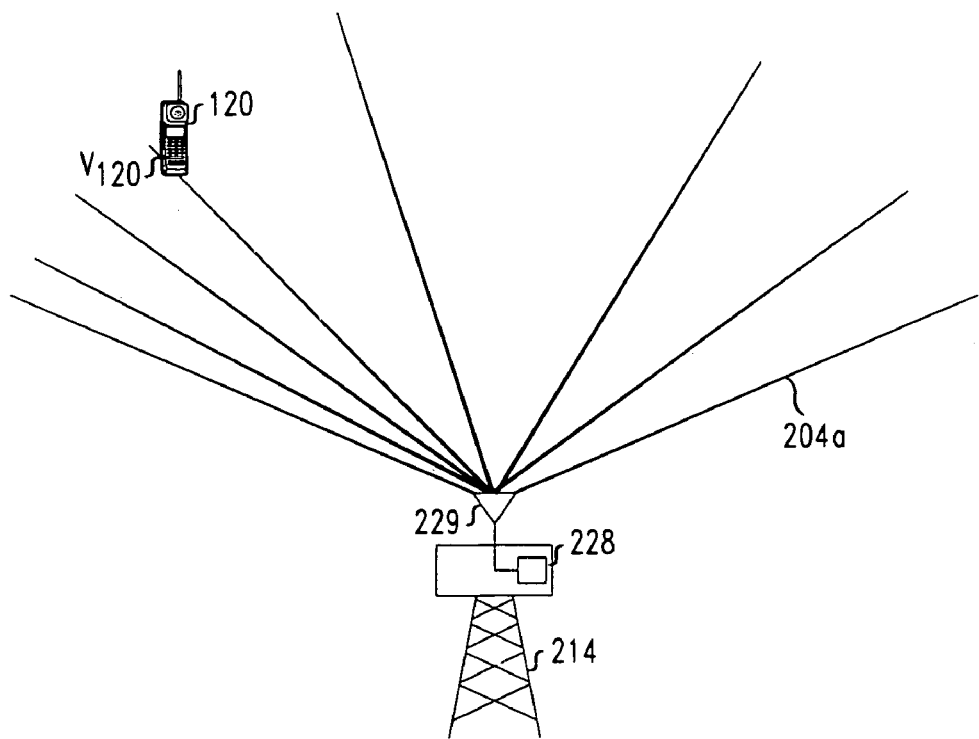
FIG. 2b shows a sector of a wireless communication system, the sector containing a base station having a non-phased-array antenna transmitting a signal to one mobile terminal.

FIG. 2b shows sector 204a where transmitter 228, in base station 214, uses a non-phased-array antenna 229 to transmit a signal to mobile terminal 120. Referring to FIGS. 2a and 2b the EM fields generated by the two antennas are compared. In both FIGS. 2a and 2b the thickness of the lines represents the relative strength of the EM field, i.e. the thicker the lines the stronger the EM field. As can be seen in FIG. 2b, non-phased-array antenna 229 generates an EM field that has the same strength at practically all locations of sector 204a that are the same distance from phased-array antenna 229. Phased-array antenna 225 generates an EM field that is typically more focused than the EM field generated by non-phased-array antenna 229. By a "more focused EM field" is meant an EM field where 1) the largest amount of energy is directed in a particular azimuth direction, and 2) as the angle from the azimuth direction increases, the strength of this EM field drops off more sharply then the strength of the EM field that is not focused, such as an EM field generated by non-phased array antenna 229. The azimuth direction is the angle θ of mobile terminal 120 from the broadside 201, the vertical plane perpendicular to the front face, of phased-array antenna 225. (As described above, although it is actually the EM energy that is directed in a particular azimuth direction, for ease of reference the EM field is referred to herein as being directed in the azimuth direction in which the largest amount of energy is directed.)

Because the EM field generated by phased-array antenna 225 is more focused (also sometimes referred to in the art as being "narrower") than the EM field generated by non-phased-array antenna 229, then the signal carried by the EM field directed by phased-array antenna 225 to mobile terminal 120 interferes less with signals to other mobile terminals in sector 102a than the signal carried by the EM field generated by non-phased-array antenna 229. This allows an increase in the number of mobile terminals in the sectors of the cells of the wireless communication system, such as sector 102a, and therefore an increase in the capacity of the wireless communication system. (The capacity of the wireless communication system is the number of calls that can be carried simultaneously by the wireless communication system.)

Figure 3:
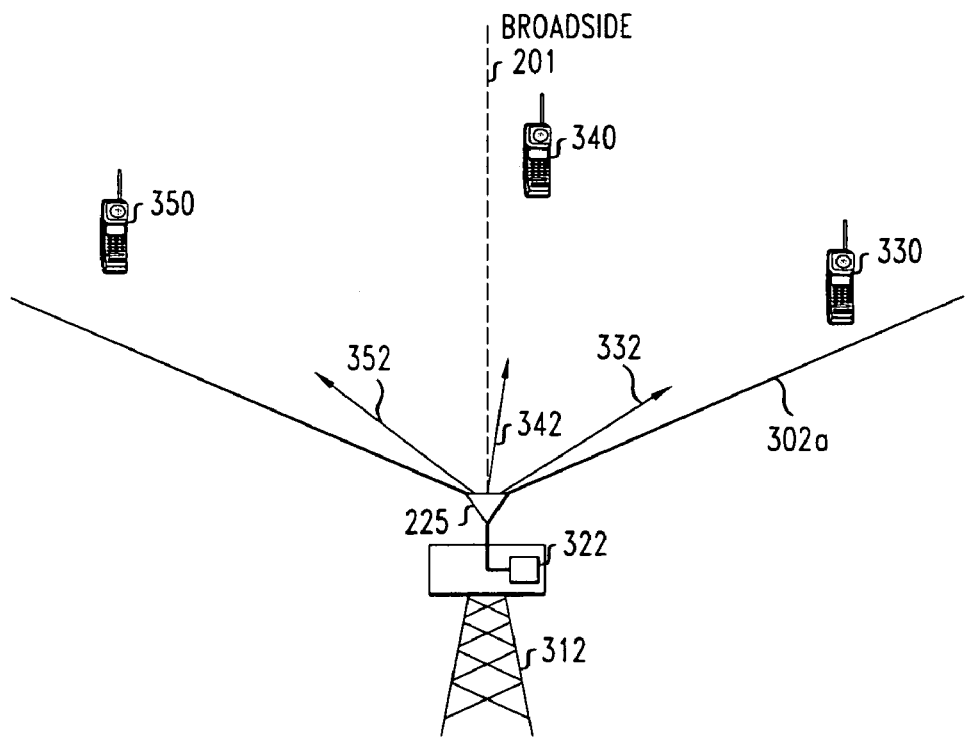
FIG. 3 shows a sector of a wireless communication system, the sector containing a base station having a phased-array antenna, and showing the magnitudes of the voltages that would need to be induced at the locations of the mobile terminals for these mobile terminals to acceptably receive a signal.

FIG. 3 shows sector 302a where transmitter 322 uses phased-array antenna 225 to transmit signals on the same frequency to mobile terminals 330, 340 and 350 within sector 302a. Phased-array antenna 225 needs to generate an EM field that induces mobile terminal 330's acceptable receive voltage, for example $V_{330}$, at the location of mobile terminal 330 to allow mobile terminal 330 to acceptably receive the signal. Similarly, the EM field should also induce mobile terminal 340's and 350's acceptable receive voltages, for example $V_{340}$ and $V_{350}$ at their respective locations. Vectors 332, 342, and 352 represent the magnitudes of the substantially minimum acceptable receive voltages to mobile terminals 330, 340, and 350, respectively, i.e., these are the minimum voltages that have to be induced at the locations of mobile terminals 330, 340, and 350 for them to acceptably receive the signal.

Figure 4:
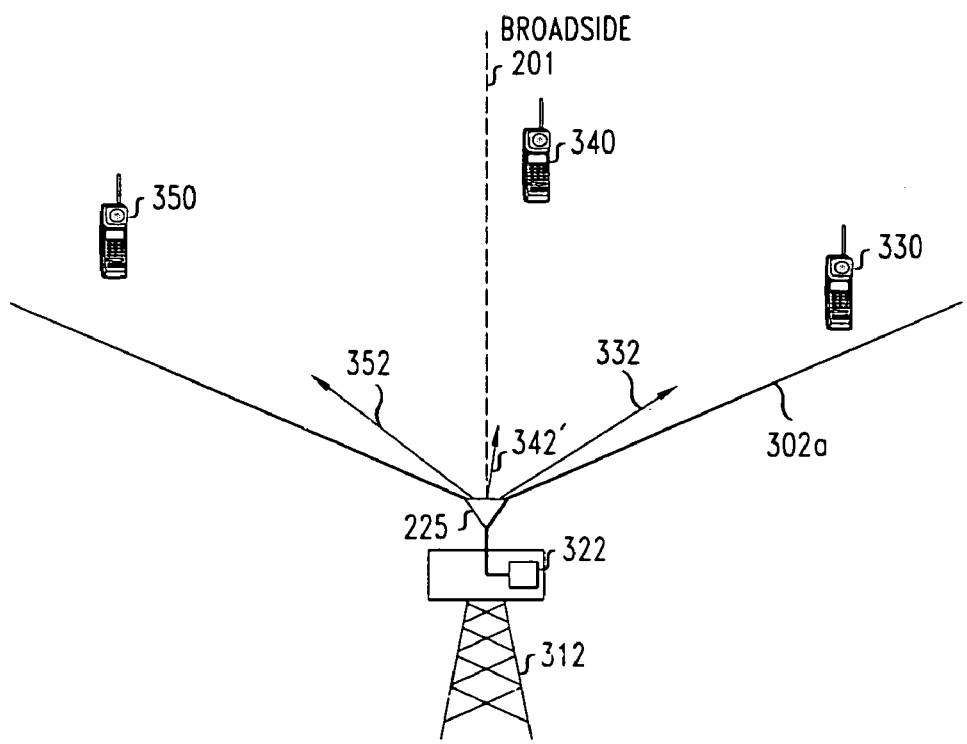
FIG. 4 shows the voltages that would be induced at the locations of the mobile terminals of FIG. 3 as a result of destructive interference.

Using phased-array antenna 225 to transmit a signal on the same frequency to the three mobile terminals 330, 340, and 350 could result in destructive interference of the EM fields directed to the mobile terminals. For example, an EM field directed to mobile terminal 330 can induce a secondary voltage at the location of mobile terminal 340, where this secondary voltage is out of phase with the primary voltage $V_{340}$, shown by vector 342, induced by the EM field directed to mobile terminal 340. In this case, the secondary voltage will reduce the magnitude of the primary voltage $V_{340}$, as shown in FIG. 4 where vector 342' shows the reduced receive voltage at mobile terminal 340. As can be seen by comparing vector 342 and 342', the voltage represented by vector 342' is significantly smaller than the voltage represented by vector 342, which is the voltage needed for mobile terminal 340 to acceptably receive the signal. Thus, the reduction in magnitude of the voltage may be large enough so that mobile terminal 340 may not receive an acceptable receive voltage, and therefore may not receive the signal with an acceptable level of signal quality.

It has been proposed to minimize the problems due to destructive interference by using focused EM fields having alternating orthogonal polarization, each EM field being directed in a fixed direction. The voltage induced at the location of a mobile terminal is induced by both the EM field whose direction is closest to the direction of the mobile terminal and by the all the other EM fields. However, since adjacent EM fields have orthogonal polarization, the possibility of destructive interference is reduced. This reduces the possibility that one of the mobile terminals will not acceptably receive the signal-receive the signal with an acceptable level of signal performance.

Although the above-described approach reduces the possibility that one of the mobile terminals will not acceptably receive a signal, the present inventors have realized that further improvement is possible. In particular, the present inventors have realized that the prior art does not take advantage of the fact that EM fields at the same frequency directed to the various mobile terminals not only destructively interfere at locations throughout the sector, but also constructively interfere.

Constructive interference is explained with reference to FIG. 5, which shows sector 102a of FIG. 1 in more detail. Sector 102a contains a base station 112 that has transmitter 522 that uses phased-array antenna 225 to transmit a signal on the same frequency to mobile terminals 130, 140 and 150 within sector 102a. Vectors 532, 542, and 552 represent the magnitudes of the substantially minimum acceptable receive voltages that need to be induced at the locations of mobile terminals 130, 140, and 150, respectively, for the mobile terminals to acceptably receive the signal carried by the EM field.

Constructive interference occurs when an EM field directed to mobile terminal 130 induces a secondary voltage at the location of mobile terminal 140, where this secondary voltage is in phase with the primary voltage, shown by vector 542, induced by the EM field directed to mobile terminal 140. (Note that the phase of the voltage induced at the location of the mobile terminals is dependent on the locations of the mobile terminals.) In this case, the magnitudes of the two voltages induced at the location of mobile terminal 140 will add. Thus, when the secondary voltage is induced at the location of mobile terminal 140, the EM field directed to the second mobile terminal can direct a smaller amount of energy to mobile terminal 140 than if the secondary voltage was not induced. This allows for a more efficient use of system resources.

In accordance with the invention, transmitter 522 generates a composite EM field to carry a signal to mobile terminals 130, 140, and 150. Transmitter 522 generates the EM field by directing energy in a plurality of azimuth directions and then uses phased-array antenna 225 to transmit (by transmitting the directed energy) a signal on the same frequency to mobile terminals 130, 140 and 150. The amount of energy directed in the azimuth direction of a mobile terminal is a function of the to location and acceptable receive strength of at least two mobile terminals. The function is such that the strength of the EM field at the location of any of these two mobile terminals is at least as large as, but not significantly larger than, needed for that mobile terminal to acceptably receive the signal carried by the EM field.

(Note: the strength of the EM field at the location of any of these two mobile terminals is not significantly larger than that needed for that mobile terminal to acceptably receive the signal carried by the EM field. If the strength was significantly larger than that needed for that mobile terminal to acceptably receive the signal, this would require that the amount of energy, and therefore power, generated in the azimuth direction of the mobile terminal be significantly more than needed to transmit the signal to the mobile terminal. Using significantly more power than needed wastes system resources, interferes with other signals, and reduces the number of signals that can be transmitted simultaneously. This results in a loss of capacity, and therefore loss of revenue.)

In an illustrative embodiment of the invention, a number of steps are performed in order to determined the amount of energy to be directed in the azimuth direction of each of the mobile terminals. In carrying out the steps processor 523, located in transmitter 522, determines for each one of the mobile terminals an EM field that would have to be generated for the mobile terminal in order to provide an acceptable receive strength thereat, the determining taking into account the strength, at the location of the mobile terminal, of EM fields previously determined for others of the mobile terminals. This determining is repeated until the EM fields determined for the mobile terminals provide an EM field strength for each mobile terminal that is substantially equal to its adequate receive strength.

In carrying out the above steps, processor 523 first determines a first EM field. The first EM field is the EM field that would provide an acceptable receive strength at one of the mobile terminals, for example mobile terminal 130, if that mobile terminal was the only mobile terminal that needed to receive the signal. The EM fields needed for each of the other mobile terminals, 140 and 150, to receive the signal are then determined. Each of these EM fields is determined as a function of the EM field strength provided at the mobile terminal by the already determined EM fields directed to other mobile terminals. This just mentioned determination is then repeated for each of the EM fields until they converge, which is achieved when the changes between the determined EM fields and the previous iteration of the determined EM fields are small. The amount of energy to be directed in the azimuth direction of each of the mobile terminals is then determined based on the EM fields thus determined.

One illustrative way of determining when the EM fields converge is by first determining the composite EM field that would be formed from the determined EM fields. A so-called composite beam-pattern corresponding to the composite EM field is then obtained (as described in more detail below). The power of the composite beam-pattern is calculated, and compared to the power of the composite beam-pattern corresponding to the last iteration of the composite EM field. For example, the EM fields can be considered to converge when the power of the composite beam-pattern corresponding to the composite EM field is within 1% of the power of the composite beam-pattern corresponding to the previous iteration of the composite EM field.

After the EM fields converge, the composite EM field is the aforementioned EM field whose strength at the location of any of at least two of the mobile terminals 130, 140, and 150 is at least as large as, but not significantly larger than, needed for that mobile terminal to acceptably receive the signal carried by the composite EM field. This saves system resources, reduces interference with other signals, and increases the number of signals that can be transmitted simultaneously, which results in an increase in capacity, and therefore an increase in revenue.

(Note that if the EM fields directed the other mobile terminals induce an acceptable receive voltage at a location of a mobile terminal, then the EM field directed to that mobile terminal is determined to be zero. For example if the EM fields to mobile terminals 140 and/or 150 induce mobile terminal 130's acceptable receive voltage at the location of mobile terminal 130, then the EM field directed to mobile terminal 130 is determined to be zero.)

The strength of an EM field at a particular location can be represented as the voltage induced by the EM field at that location. Thus, the voltage induced by the composite EM field at the location of any of at least two of the mobile terminals 130, 140, and 150 is at least as large as, but not significantly larger than, the substantially minimum acceptable receive voltage. This voltage will be referred to herein as the adequate receive voltage.

Figure 6A:
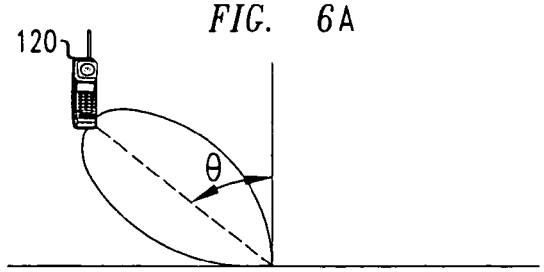
Figure 6B:
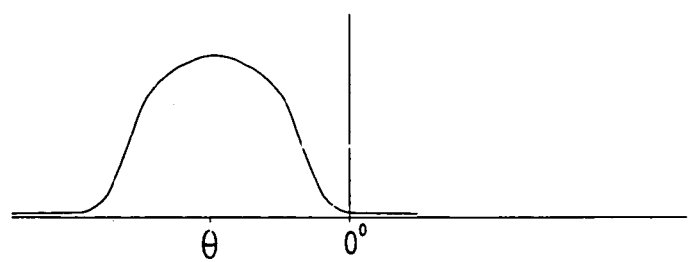

The strength of an EM field at a particular fixed radius from the phased-array antenna can be represented by a beam-pattern, such as a voltage beam-pattern. Thus, an EM field can be represented by a beam-pattern. Referring again to FIG. 2a, the magnitudes of the voltages induced by the EM field at several locations 260, 262, 264, 266, 268, and 269 that are the same fixed distance r from phased-array antenna 225, but at different azimuth directions, for example $-80°$, $-67°$, $-50°$, $-40°$, $15°$, and $60°$, respectively are plotted against the azimuth direction. The plot can be either in the Cartesian coordinate system, as shown in FIG. 6a, or in the polar coordinate system, as shown in FIG. 6b. Thus, the distance from the phased-array antenna to any point along the voltage beam-pattern is the magnitude of the voltage induced by the EM field at fixed distance r in the azimuth direction of that point. (Although, fixed distance r can be at any distance from phased-array antenna 225, r is typically chosen to be 30 meters.) Therefore, a voltage beam-pattern is the relationship of the magnitudes of the voltages induced by an EM field to the azimuth directions of the locations where the voltages are induced, where all of the locations are the same distance from phased-array antenna 225.

Figure 7:
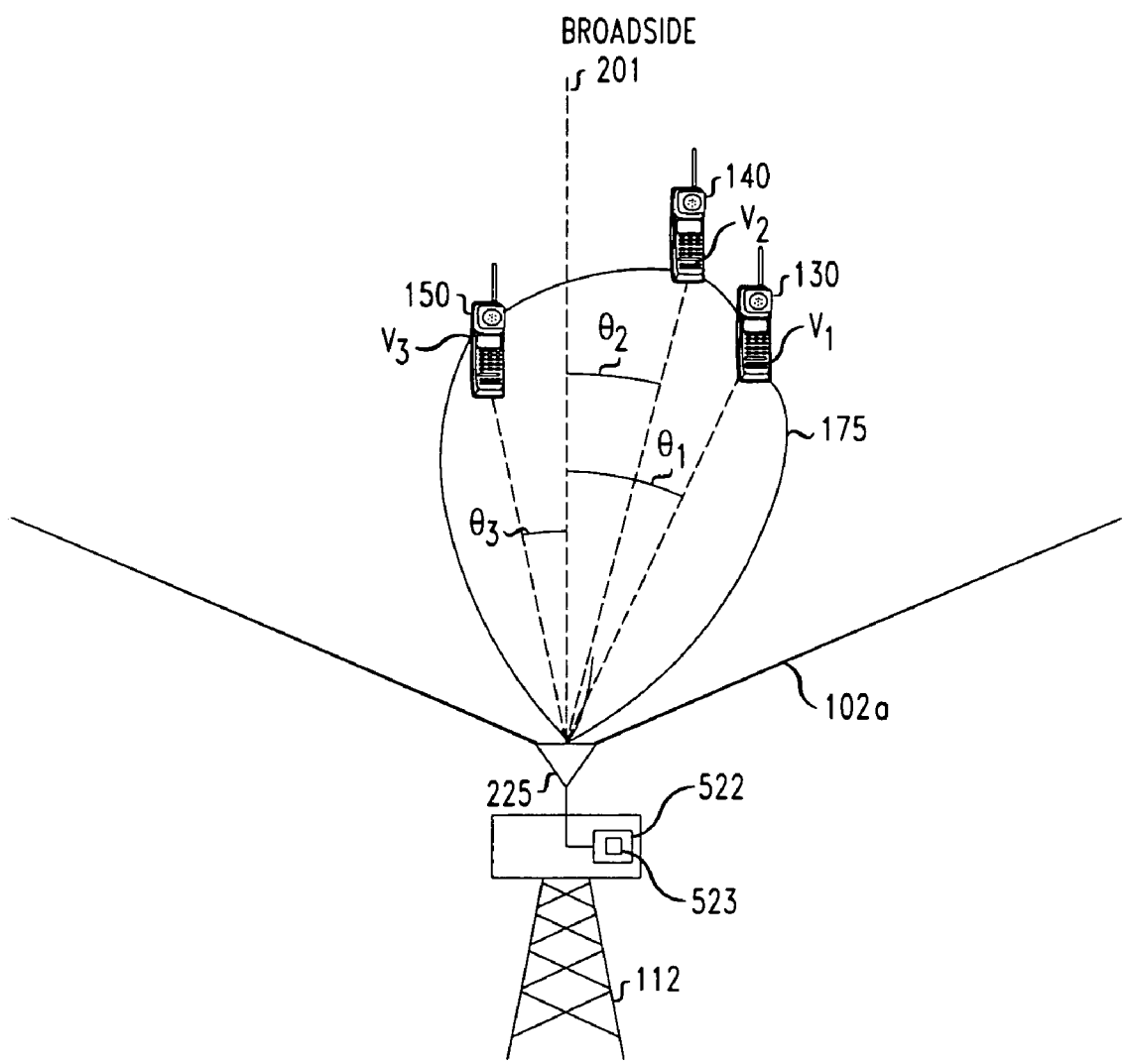
FIG. 7 shows a voltage beam-pattern that would be generated by the phased-array antenna of FIG. 5.

In an illustrative embodiment of the invention, the composite EM field is determined by determining its corresponding composite voltage beam-pattern. FIG. 7 shows composite voltage beam-pattern 175 corresponding to the EM field needed to induce the voltages of FIG. 5. As explained above, the distance from phased-array antenna 225 to the any point along a voltage beam-pattern is the magnitude of the voltage induce by the EM field at fixed distance r in the azimuth direction of that point. Thus, the distance of any of the mobile terminals 130, 140, and 150 from phased-array antenna 225 on composite voltage beam-pattern 175 is the magnitude of the voltage in the azimuth direction of that mobile terminal at the fixed distance r. This magnitude is at least as large as, but not significantly larger than, the voltage that would be induced in the azimuth direction of the mobile terminal at the fixed distance r when the adequate receive voltage is induced at the location of the mobile terminal.

Figure 5:
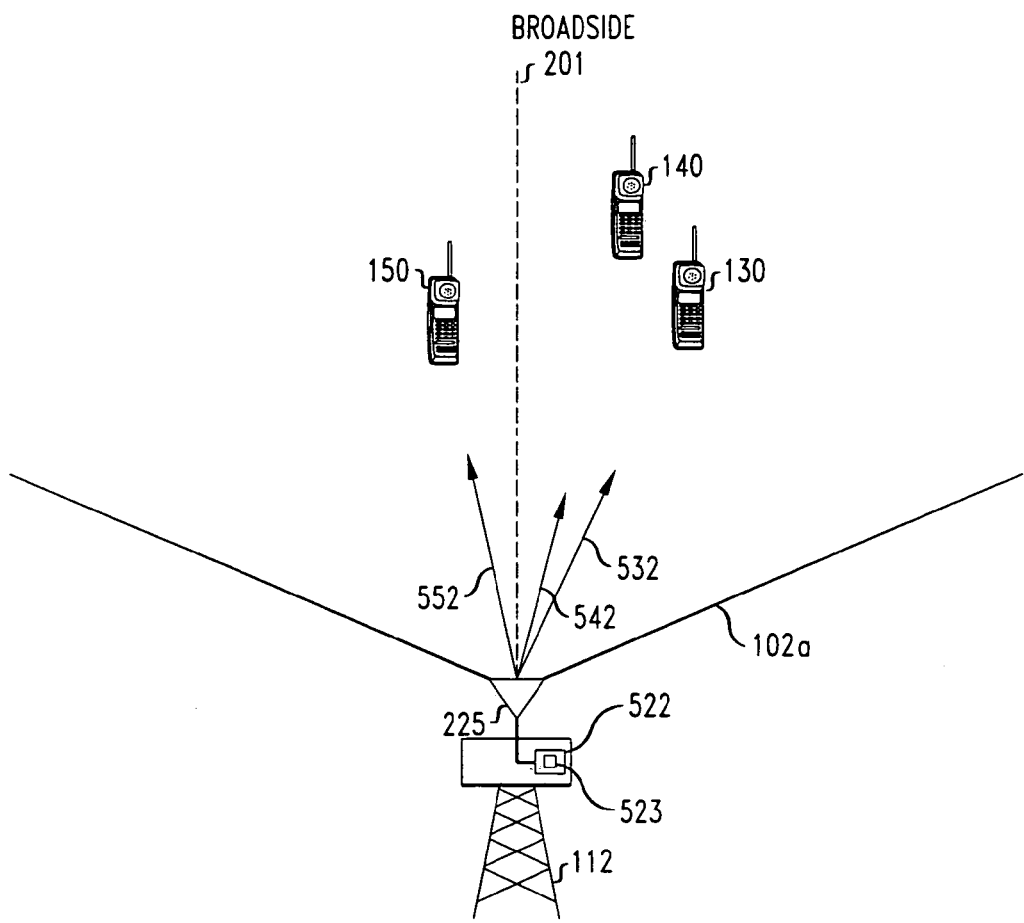
FIG. 5 shows a sector of the wireless communication system of FIG. 1, the sector containing a base station having a phased-array antenna, and showing the magnitudes of the voltages induced at the locations of the mobile terminals for these mobile terminals to acceptably receive a signal.
Figure 8:
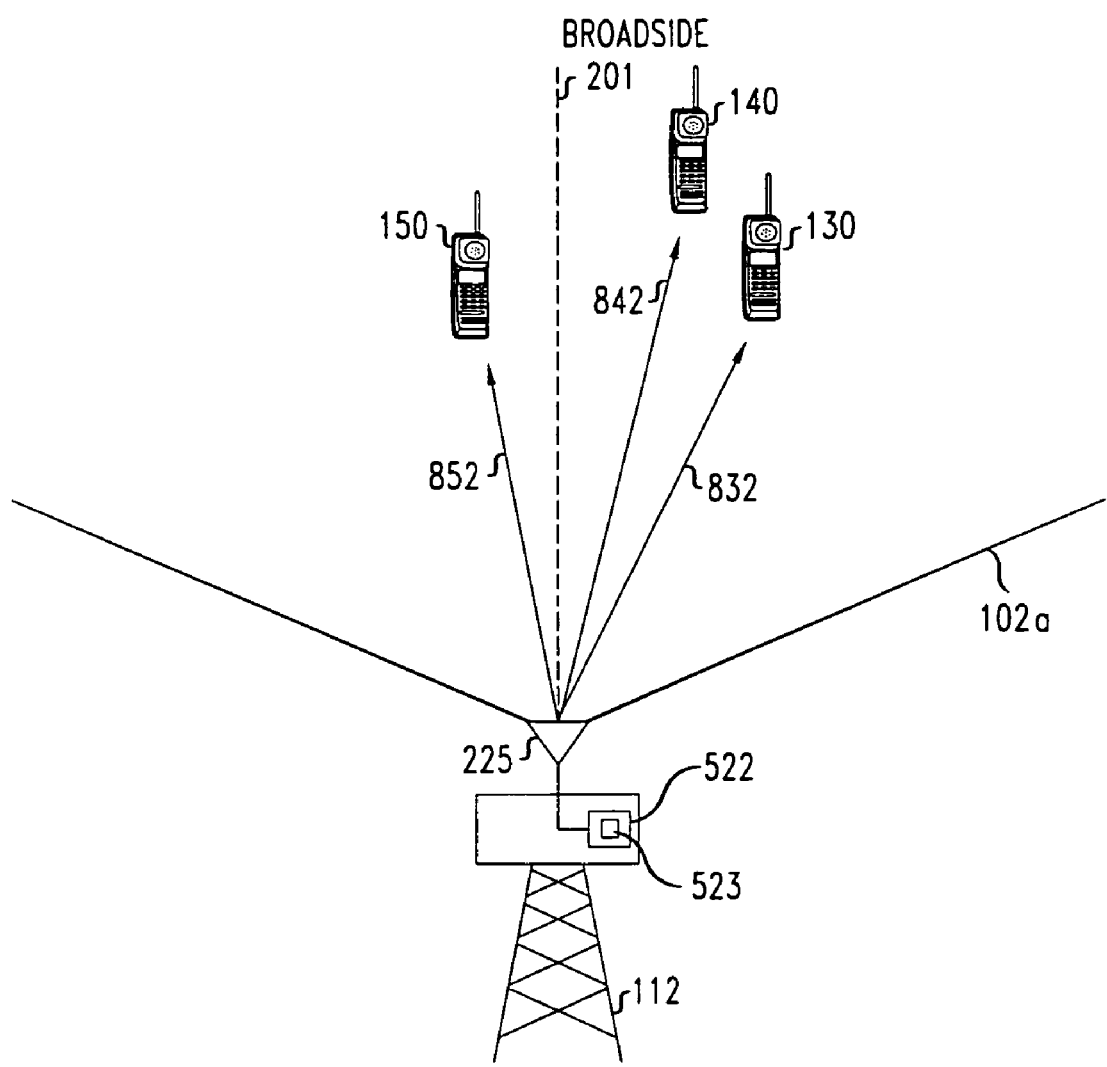
FIG. 8 shows the voltages of FIG. 5 normalized.

For ease of analysis, adequate receive voltages shown by the vectors 532, 542, and 552 in FIG. 5 are normalized to the normalized adequate receive voltages, as shown in FIG. 8 by vectors 832, 842, and 852, respectively. The normalized adequate receive voltages are the voltages that would need to be induced at fixed distance r in the azimuth direction of the mobile terminals in order to ensure that the adequate receive voltages are induced at the location of the mobile terminals.

Referring again to FIG. 7, one method of determining composite voltage-beam 175 pattern is now described. Processor 523 determines for each one of the mobile terminals a voltage beam-pattern that would have to be generated for the mobile terminal in order to provide an acceptable receive strength thereat, the determining taking into account the EM field strength, at the location of the mobile terminal, of voltage beam-patterns previously determined for others of the mobile terminals. This determining is repeated until the voltage beam-patterns determined for the mobile terminals provide an EM field strength for each mobile terminal that is substantially equal to its adequate receive strength.

In carrying out the above steps, processor 523 first determines a first voltage beam-pattern. The first voltage beam-pattern is the voltage beam-pattern that would induce an acceptable receive voltage at one of the mobile terminals, for example mobile terminal 130, if that mobile terminal was the only mobile terminal that needed to receive the signal. The voltage beam-patterns needed for each of the other mobile terminals, 140 and 150, to receive the signal are then determined. Each of these voltage beam-patterns is determined as a function of the voltage(s) provided in the direction of the mobile terminal by the already determined voltage beam-patterns directed to other mobile terminals. The just mentioned determining step is repeated until the voltage beam-patterns converge.

The voltage beam-patterns converge when the changes between the determined voltage beam-patterns and the previous iteration of the determined voltage beam-patterns are small. One illustrative way of determining when this occurs is by first determining the composite voltage beam-pattern that would be formed from the determined voltage beam-patterns. The power of the composite beam-pattern is calculated, and compared to the power of the composite beam-pattern that would be formed from the last iteration of voltage beam-patterns. For example, the voltage beam-patterns can be considered to converge when the power of the composite beam-pattern is within 1% of the power of the composite beam-pattern that would be formed from the last iteration of the voltage beam-patterns.

Figure 9A:
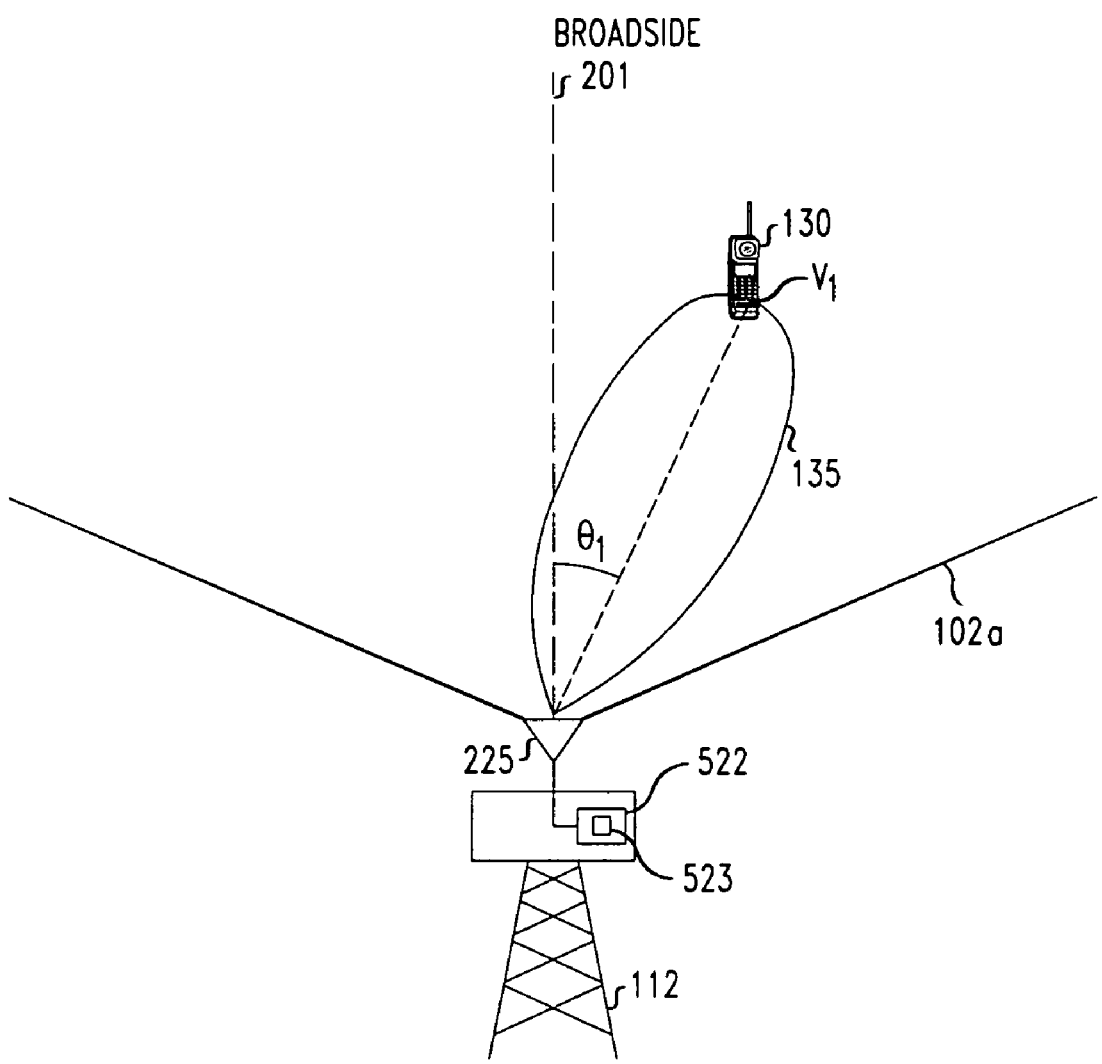
Figure 9B:
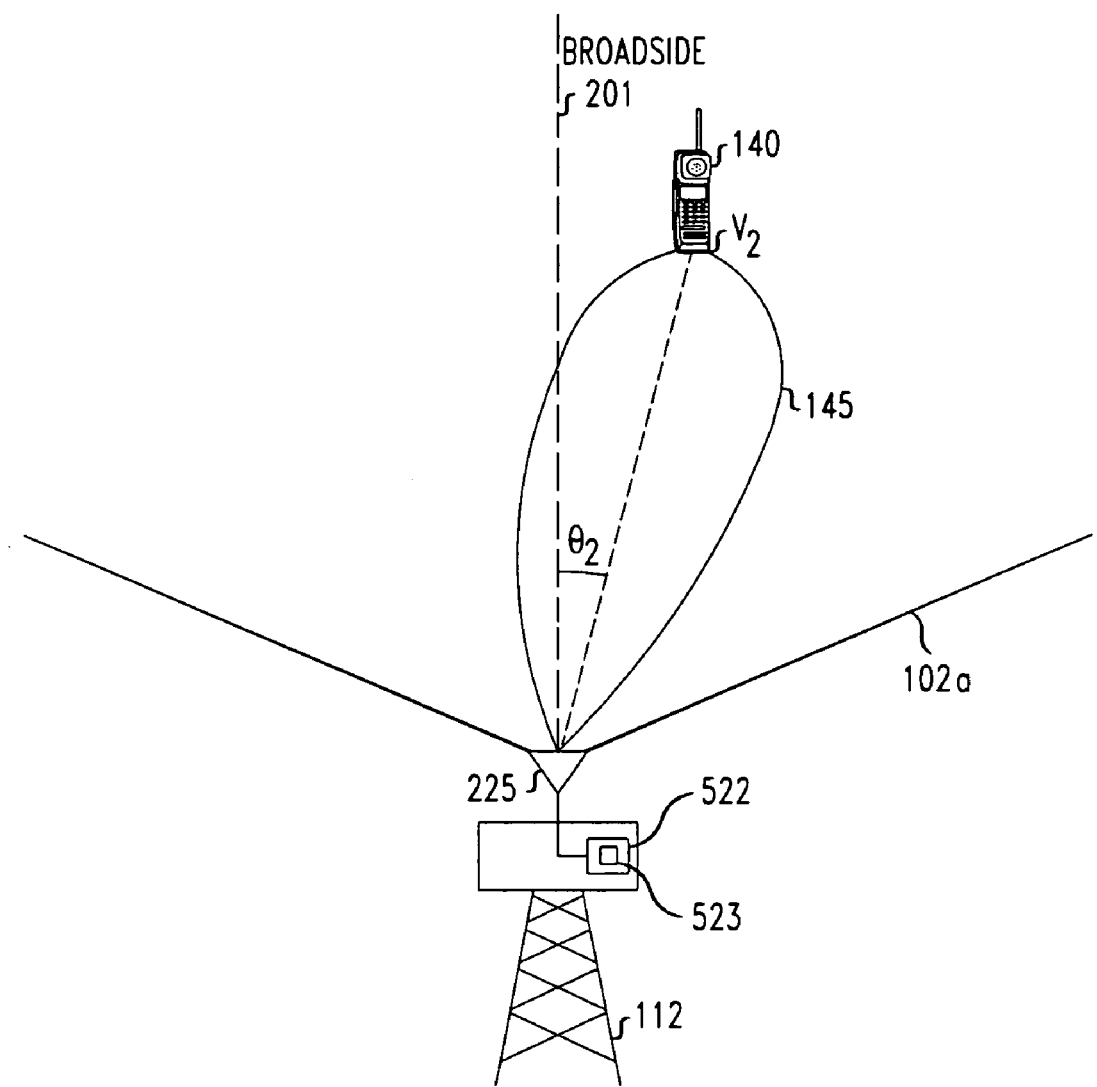

Still referring to FIG. 7, the shaping method used to generate the composite voltage beam-pattern according to one embodiment of the invention is now described. The azimuth directions $\theta_1$, $\theta_2$, and $\theta_3$, and normalized adequate receive voltages $V_1$, $V_2$, and $V_3$ for mobile terminal 130, 140, and 150, respectively, are determined. The normalized adequate receive voltages and azimuth directions can be determined in any manner. For example, the azimuth direction can be determined from the location of the mobile terminal and the adequate receive voltage can be determined from either power control information or quality of signal information, such as the error information bits, received from the mobile terminal and then normalized. FIGS. 9a, 9b, and 9c each show sector 102a containing base station 112, and one of the mobile terminal 130, 140, and 150, respectively. Each mobile terminal 130, 140, and 150 has an associated voltage beam-pattern 135, 145, and 155, respectively, which can be generated using the mobile terminal's azimuth direction and normalized adequate receive voltage.

Once the normalized adequate receive voltages and the azimuth directions are determined, the voltage beam-pattern associated with one of the mobile terminals, for example mobile terminal 130, is determined. The method of forming the beam-pattern to transmit a signal to one mobile terminal using a phased-array antenna is well known and is discussed in antenna references, such as JOSEPH C. LIBERTI, JR & THEODORE S. RAPPAPORT, SMART ANTENNAS FOR WIRELESS COMMUNICATIONS: IS-95 AND THIRD GENERATION CDMA APPLICATIONS, Prentice Hall PTR, (1999), incorporated herein by this reference. A description of forming a beam-pattern to transmit a signal to one mobile terminal using a phased-array antenna can be found in LIBERTI pages 83–88.

Figure 10:
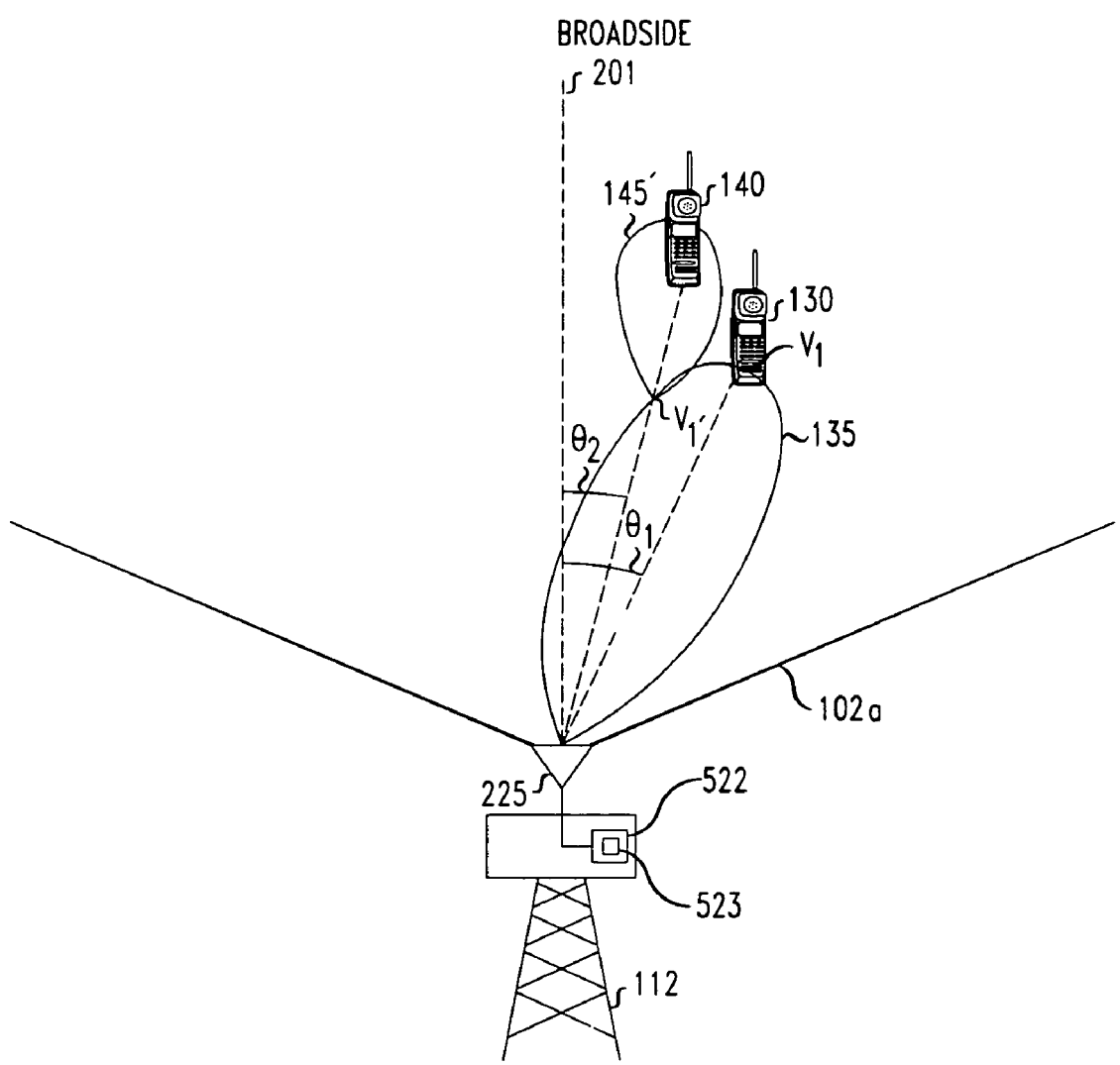
FIG. 10 shows a voltage beam-pattern that would be generated by the phased-array antenna of FIG. 5 transmitting a signal to a first mobile terminal and showing an additional beam-pattern that would be needed to transmit the signal to a second mobile terminal.
Figure 11:
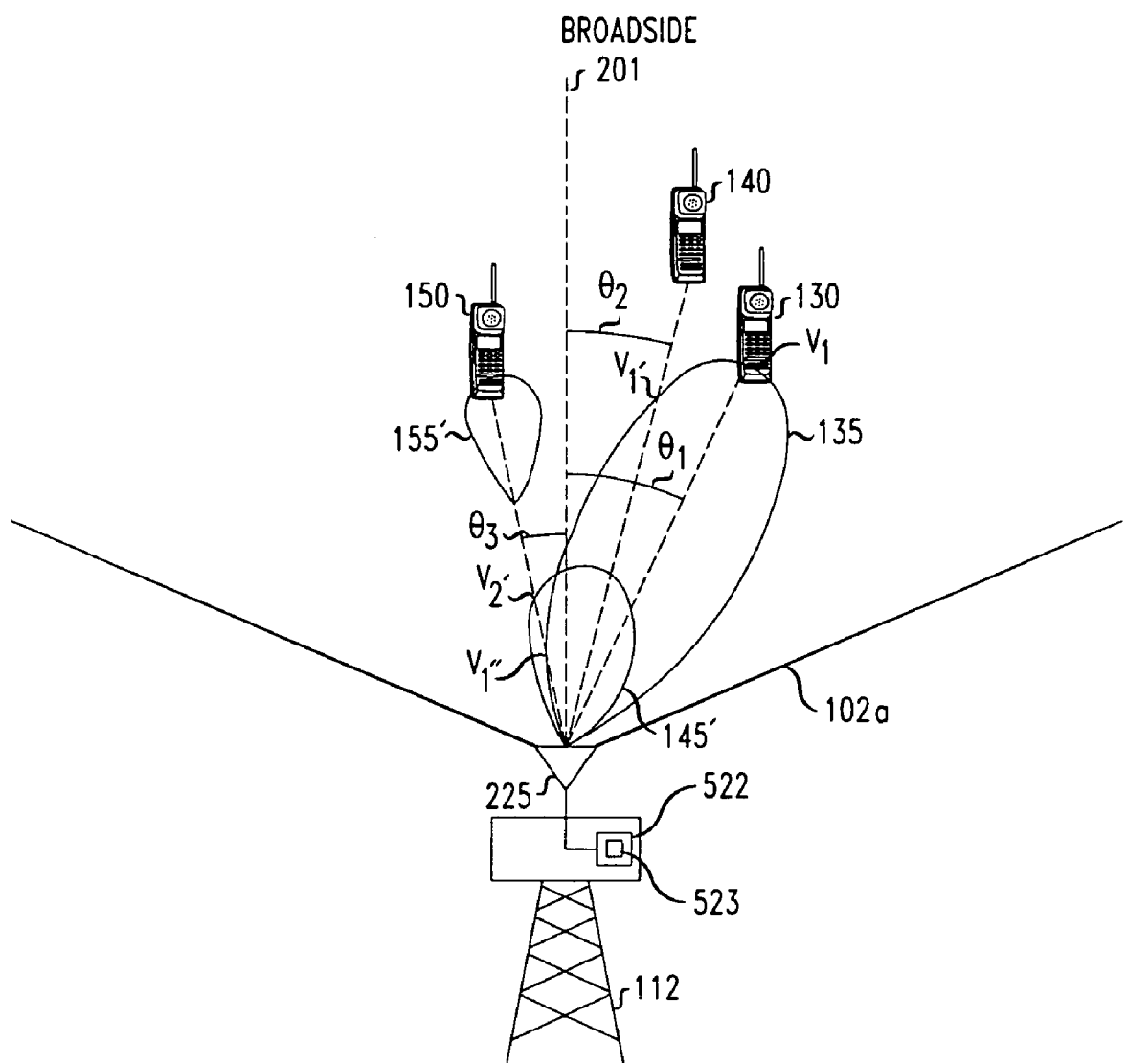
FIG. 11 shows the voltage beam-pattern that would be generated by the phased-array antenna of FIG. 5 transmitting a signal to the first mobile terminal, the additional beam-pattern that would be needed for transmitting the signal to the second mobile terminal, and an additional beam-pattern that would be needed for transmitting the signal to a third mobile terminal.

As can be seen in FIG. 10, voltage beam-pattern 135 is shaped to provide the normalized adequate receive voltage, $V_1$, in azimuth direction $\theta_1$, i.e. the azimuth direction of mobile terminal 130. Voltage beam-pattern 135 also provides some voltage $V_1'$, in azimuth direction $\theta_2$, i.e. the azimuth direction of mobile terminal 140. As shown in FIG. 9b, if mobile terminal 140 was the only mobile terminal that needed to receive the signal, phased-array antenna 225 would need to produce a voltage beam-pattern that provides $V_2$ volts in azimuth direction $\theta_2$ for mobile terminal 140 to acceptably receive the signal. However, as can be seen from FIG. 10, voltage beam-pattern 135 already provides some voltage in azimuth direction $\theta_2$. Thus, voltage beam-pattern 145 is determined, referred to herein as determined voltage beam-pattern 145', to provide a voltage of $V_2-V_1'$ volts in the $\theta_2$ azimuth direction. FIG. 11 shows voltage beam-patterns 135 and 145' as they would be generated by phased-array antenna 225.

Figure 12:
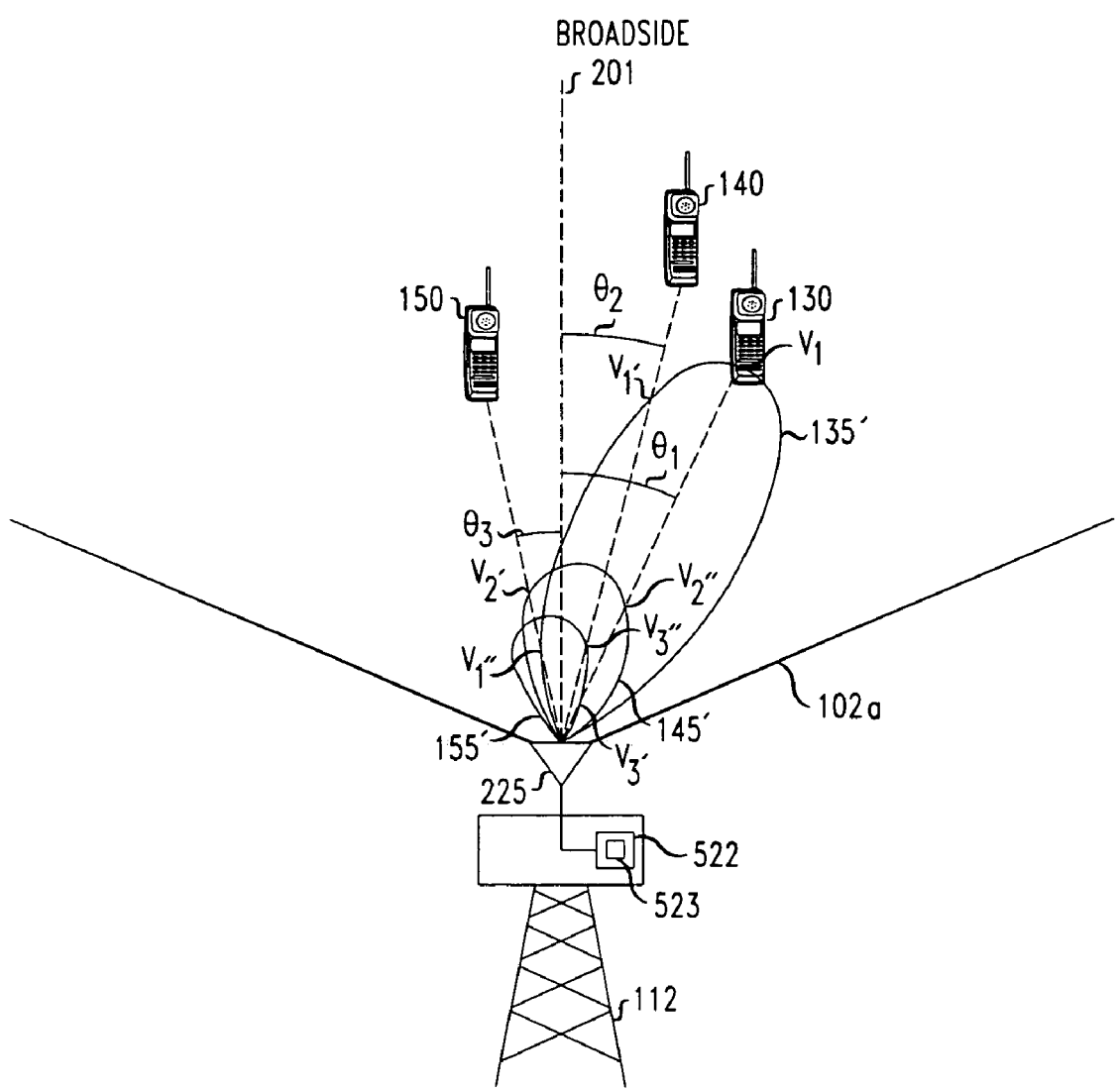
FIG. 12 shows the phased-array antenna of FIG. 5 transmitting the three beam-patterns of FIG. 11.

As shown in FIG. 9c, if mobile terminal 150 was the only mobile terminal that needed to receive the signal, phased-array antenna 225 would need to produce voltage beam-pattern 155 that provides $V_3$ volts in azimuth direction $\theta_3$ for mobile terminal 150 to acceptably receive the signal. However, as can be seen from FIG. 11, voltage beam-patterns 135 and 145' already provide some voltage $V_1''$ and $V_2'$, respectively, in azimuth direction $\theta_3$. Thus, voltage beam-pattern 155 is determined, referred to herein as determined voltage beam-pattern 155', to provide a voltage of $V_3-V_2'-V_1''$ volts in the $\theta_3$ azimuth direction. FIG. 12 shows voltage beam-patterns 135, 145', and 155' as they would be generated by phased-array antenna 225.

As can be seen in FIG. 12, determined voltage beam-patterns 145' and 155' provide $V_2''$ and $V_3'$ volts, respectively, in azimuth direction $\theta_1$. Therefore, voltage beam-pattern 135 is determined again taking into account the voltage provided in azimuth direction $\theta_1$ by determined voltage beam-patterns 145' and 155'. Determining voltage beam-pattern 135 produces a determined voltage beam-pattern 135'.

Determining voltage beam-pattern 135 to produce determined voltage beam-pattern 135' changes the amount of voltage $V_1'$ it provides in azimuth direction $\theta_2$. Additionally, voltage beam-pattern 155' provides $V_3''$ volts in azimuth direction $\theta_2$. Therefore, voltage beam-pattern 145' should now be determined again taking into account determined voltage beam-patterns 155' and 135'. This determining of voltage beam-pattern 145' changes the amount of voltage it is providing in the $\theta_1$ and $\theta_3$ azimuth directions. Because determined voltage beam-patterns 135' and 145' have again been determined, determined voltage beam-pattern 155' should be determined again taking into account the newly determined voltage beam-patterns 135' and 145'.

This process of determining the three voltage beam-patterns is repeated until each of the three voltage beam-patterns converges. The voltage beam-patterns converge when the changes between the determined voltage beam-patterns and the previous iteration of the determined voltage beam-patterns are small. To calculate when this occurs, first the composite voltage beam-pattern that would be formed from the determined voltage beam-patterns is determined. The power of the composite beam-pattern is calculated, and compared to the power of the composite beam-pattern that would be formed from the last iteration of voltage beam-patterns. For example, the voltage beam-patterns can be considered to converge when the power of the composite beam-pattern is within 1% of the power of the composite beam-pattern that would be formed from the last iteration of the voltage beam-patterns.

In an alternative embodiment of the shaping method, the amount of energy to be directed in the azimuth direction of a mobile terminal is arrived at by first determining for each one of the mobile terminals an EM field that would have to be generated for the mobile terminal in order to provide an acceptable receive strength thereat if that mobile terminal was the only mobile terminal that needed to receive the signal. Then, these EM fields are used to determine a scaling factor, as described below by which to scale each of the EM fields so that the EM fields determined for at least two of the mobile terminals provide an EM field strength for each of these two mobile terminals that is substantially equal to its adequate receive strength.

Therefore, the shaping method determines and combines voltage beam-patterns 135, 145, and 155 so that the resulting composite voltage beam-pattern has a voltage in the direction of any of at least two of the mobile terminals 130, 140, and 150 that is at least as large as, but not significantly larger than, the normalized adequate receive voltage. This saves system resources, reduces interference with other signals, and increases the number of signals that can be transmitted simultaneously, which results in an increase in capacity, and therefore an increase in revenue.

Mathematical Explanation of the Shaping Method

Figure 13:
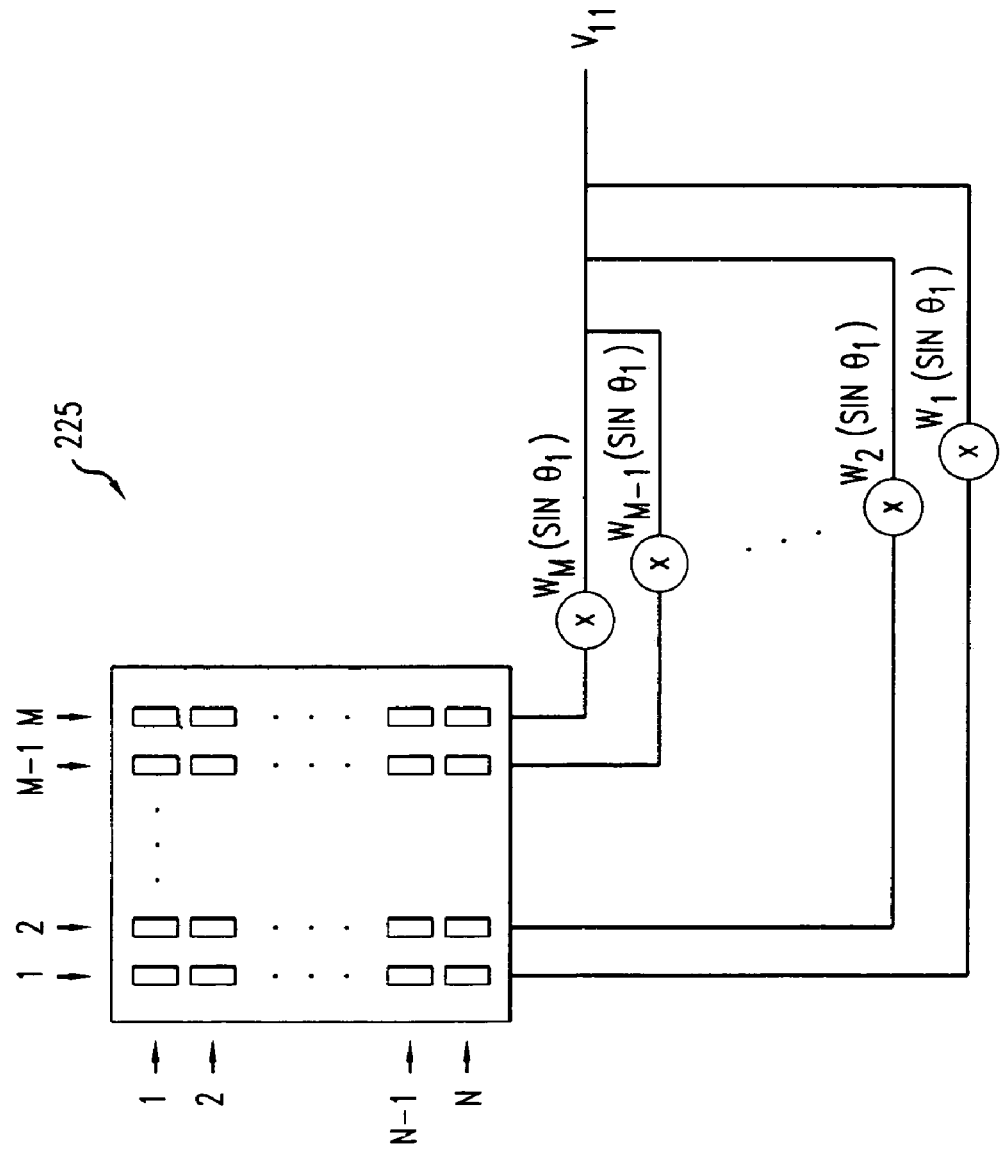
FIG. 13 is a block diagram of a phased-array antenna.

FIG. 13 shows phased-array antenna 225 in more detail. Phased-array antenna 225 has an array of M by N antenna elements. Phased-array antenna 225 shapes and directs the EM field, and therefore the voltage beam-pattern, generated by it using the columns and/or rows of antenna elements. For example, phased-array antenna 225 can use the M columns of antenna elements to shape and direct the voltage beam-pattern in one, for example the azimuthal direction. Phased-array antenna 225 can also use the N rows of antenna elements to shape and direct the voltage beam-pattern in another, for example the elevation direction.

Referring to FIGS. 7 and 13 concurrently, the manner in which phased array antenna 225 generates a beam-pattern that produces the normalized adequate receive voltage at mobile terminal 130 is now described. As described above, transmitter 522 obtains the azimuth direction $\theta_1$ and normalized adequate receive voltage $V_1$ for mobile terminal 130.

Phased-array antenna 225 has a weight $W_1(\sin \theta_1) \ldots W_M(\sin \theta_1)$ associated with each of the columns of antenna elements. Each weight $W_1(\sin \theta_1) \ldots W_M(\sin \theta_1)$ includes an amplitude and a phase, as shown in equation (1).

$$W_y(\sin\theta_1) = \frac{1}{\sqrt{M}} \exp\left(j2\pi \frac{d}{\lambda}\left(y - \frac{M+1}{2}\right)\sin\theta_1\right) \quad (1)$$

Where d is the distance between two adjacent antenna columns, $\lambda$ is the wavelength of phased-array antenna's carrier frequency, and y is the number of the antenna column (any number between 1 and M). As can be seen from equation 1, the phase of the weights $W_1(\sin \theta_1) \ldots W_M(\sin \theta_1)$ is dependent on the azimuth direction $\theta_1$ of mobile terminal 130.

Phased-array antenna 225 uses voltage $V_{11}$ and the set of weights $W_1(\sin \theta_1) \ldots W_M(\sin \theta_1)$ to generate beam-pattern 135. As is known in the art, voltage $V_{11}$ is the voltage that can be used by phased-array antenna 225 to induce the normalized adequate receive voltage $V_1$ if phased-array antenna 225 had to generate a voltage beam-pattern only to ensure that mobile terminal 130 acceptably receives the signal. Phased-array antenna 225 provides each of the columns of antenna elements with the product of voltage $V_{11}$ and the weight $W_1(\sin \theta_1) \ldots W_M(\sin \theta_1)$ associated with the column, respectively. Weights $W_1(\sin \theta_1) \ldots W_M(\sin \theta_1)$ compose weight vector $Z_1$ as shown in equation 2.

$Z_1$=the transpose of $[W_1(\sin \theta_1), W_2(\sin \theta_1), \ldots W_M(\sin \theta_1)]$ \quad (2)

Voltage beam-pattern 135 can be represented as $V_1 f(u-u_1)$, where u is $\sin(\theta)$, $u_1$ is $\sin(\theta_1)$, and $$f(u - u_1) = \frac{1}{M} \frac{\sin\left[M\pi \frac{d}{\lambda}(u - u_1)\right]}{\sin\left[\pi \frac{d}{\lambda}(u - u_1)\right]} \quad (3)$$

The voltage of beam pattern 135 in the u direction can be represented as $F_1(u)$. Thus, $F_1(u) = V_1 f(u - u_1)$.

Thus, phased-array antenna 225 generates a voltage beam-pattern using a weight vector and a voltage. Therefore, there is a weight vector $Z_1$, $Z_2$, and $Z_3$ associated with each voltage beam-pattern 135, 145, and 155, respectively. To determine the voltage beam-patterns according to the shaping method described above, each of the weight vectors $Z_1$, $Z_2$, $Z_3$ is multiplied by a scaling factor $C_1$, $C_2$, $C_3$, respectively. The scaled weight vectors are then combined to obtain composite weight vector $Z_5$ of composite beam-pattern 175. Therefore, composite weight vector $Z_5$ is given by equation (4).

$Z_5 = C_1 Z_1 + C_2 Z_2 + C_3 Z_3$ \quad (4)

Based on the shaping method described above, the one way to determine the scaling factors $C_1$, $C_2$, and $C_3$ is now described.

The voltage $F_5(u_x)$ of composite beam-pattern 175 in the $\theta_x$ azimuth direction is the sum of the portions of the beam-patterns 135, 145, and 155 in the $\theta_x$ azimuth direction (i.e. the azimuth direction of the particular mobile terminal) scaled by their associated scaling factor $C_1$, $C_2$, $C_3$. The amount of voltage in the $\theta_x$ azimuth direction, $F_5(u_x)$, is then shown in equation 5.

$F_5(u_x) = [C_1 f(u_x - u_1) + C_2 f(u_x - u_2) + C_3 f(u_x - u_3)]$ \quad (5)

Where:

x is 1 for mobile terminal 130, 2 for mobile terminal 140, and 3 for mobile terminal 150;

$C_1 f(u_x - u_1)$ is the portion of voltage beam-pattern 135 in the azimuth direction $\theta_x$;

$C_2 f(u_x - u_2)$ is the portion of voltage beam-pattern 145 in the azimuth direction $\theta_x$;

$_3 f(u_x - u_3)$ is the portion of voltage beam-pattern 155 in the azimuth direction $\theta_x$;

$u_x$ is $\sin(\theta_x)$;

$u_1$ is $\sin(\theta_1)$;

$u_2$ is $\sin(\theta_2)$; and $u_3$ is $\sin(\theta_3)$.

The voltage of composite voltage beam-pattern 175 in each of the three azimuth directions $\theta_1$, $\theta_2$, and $\theta_3$ can be calculated using equation (5).

The voltage $F_5(u_1)$ of composite voltage beam-pattern 175 in azimuth direction $\theta_1$ is given by equation 6:

$F_5(u_1) = [C_1 + C_2 f(u_1 - u_2) + C_3 f(u_1 - u_3)]$ \quad (6)

the voltage $F_5(u_2)$ of composite voltage beam-pattern 175 in azimuth direction $\theta_2$ is given by equation 7:

$$F_5(u_2) = [C_1 f(u_2-u_1) + C_2 + C_3 f(u_2-u_3)] \quad (7)$$

and the voltage $F_5(u_3)$ of composite voltage beam-pattern 175 in azimuth direction $\theta_3$ is given by equation 8:

$$F_5(u_3) = [C_1 f(u_3-u_1) + C_2 f(u_3-u_2) + C_3] \quad (8)$$

The composite voltage beam-pattern 175 should provide at least the normalized adequate receive voltage in azimuth direction $\theta_x$. Therefore, the magnitude of voltage $F_5(u_x)$ in azimuth direction $\theta_x$ must be equal to or greater than the normalized adequate receive voltage $V_x$ needed in azimuth direction $\theta_x$.

$$|F_5(u_x)| \geq V_x \quad (9)$$

Substituting the values associated with the three mobile terminals for x, equation 9 leads to following three inequalities:

$$|[C_1 + C_2 f(u_1-u_2) + C_3 f(u_1-u_3)]| \geq V_1 \quad (10),$$

$$|[C_1 f(u_2-u_1) + C_2 + C_3 f(u_2-u_3)]| \geq V_2 \quad (11),$$

$$|[C_1 f(u_3-u_1) + C_2 f(u_3-u_2) + C_3]| \geq V_3 \quad (12).$$

Removing the absolute values in inequality 10 and solving for $C_1$:

$$C_1 \geq V_1 - [C_2 f(u_1-u_2) + C_3 f(u_1-u_3)] \quad (13),$$

$$\text{or } C_1 \geq -V_1 - [C_2 f(u_1-u_2) + C_3 f(u_1-u_3)] \quad (14).$$

However if the sum of the portions of the determined voltage beam-patterns 145' and 155' in the $\theta_1$ azimuth direction, i.e. $[C_2 f(u_1-u_2) + C_3 f(u_1-u_3)]$, is larger than the normalized adequate receive voltage $V_1$ then there is no need for a determined voltage beam-pattern 135' and therefore $C_1$ can be set to zero. Therefore, inequalities 13 and 14 become:

$$C_1 = \max(0, V_1 - [C_2 f(u_1-u_2) + C_3 f(u_1-u_3)]), \text{ or} \quad (15)$$

$$C_1 = \min(0, -V_1 - [C_2 f(u_1-u_2) + C_3 f(u_1-u_3)]), \quad (16)$$

similarly, inequality 11 becomes:

$$C_2 = \max(0, V_2 - [C_1 f(u_2-u_1) + C_3 f(u_2-u_3)]), \text{ or} \quad (17)$$

$$C_2 = \min(0, -V_2 - [C_1 f(u_2-u_1) + C_3 f(u_2-u_3)]), \quad (18)$$

and equation 12 becomes:

$$C_3 = \max(0, V_3 - [C_1 f(u_3-u_1) + C_2 f(u_3-u_2)]), \text{ or} \quad (19)$$

$$C_3 = \min(0, -V_3 - [C_1 f(u_3-u_1) + C_2 f(u_3-u_2)]), \quad (20)$$

Since there are two choices for each scaling factor (equations 15 or 16 for $C_1$, equations 17 or 18 for $C_2$, and equations 19 and 20 for $C_3$) there are eight combinations of scaling factors. Note that $C_1$ is greater than or equal to zero in equation 15 and less than or equal to zero in equation 16. $C_2$ is greater than or equal to zero in equation 17 and less than or equal to zero in equation 18. $C_3$ is greater than or equal to zero in equation 19 and less than or equal to zero in equation 20. For ease of reference, the shaping method will first be described with the combination of scaling factors that would result from all the scaling factors $C_1$, $C_2$, and $C_3$ being positive, which is result of equations 15, 17, and 19.

Once the normalized adequate receive voltages $V_1$, $V_2$, and $V_3$ and the azimuth directions $\theta_1$, $\theta_2$, and $\theta_3$ are determined, one of the voltage beam-patterns, for example 135, is generated as if mobile terminal 130 (that corresponds to this voltage beam-pattern) was the only mobile terminal that needed to receive the signal. To generate this $C_2$ and $C_3$ are set to zero. Setting $C_2$ and $C_3$ to zero in equation 15 produces $C_1$ is equal to $V_1$.

Determined voltage beam-pattern 145' is then calculated using a portion of the voltage beam-pattern 135 in the $\theta_2$ azimuth direction, i.e. $C_1 f(u_2-u_1)$. To generate beam-pattern 145', $C_1$ is set to the last obtained value of $C_1$, i.e. $C_1 = V_1$, and $C_3$ is set to zero. Setting $C_1 = V_1$ and $C_3 = 0$ in equation 17, $C_2$ is calculated. The calculated $C_2$ is referred to herein as $C_2'$.

Determined voltage beam-pattern 155' is then calculated using the portions of voltage beam-patterns 135 and 145' in the $\theta_3$ azimuth direction, i.e. $C_1 f(u_3-u_1)$ and $C_2 f(u_3-u_2)$. To generate determined voltage beam-pattern 155', $C_1$ and $C_2$ are set to the last obtained values of $C_1$ and $C_2$, i.e., $C_1 = V_1$ and $C_2 = C_2'$. Setting $C_1 = V_1$ and $C_2 = C_2'$ in equation 19, $C_3$ is calculated, referred to herein as $C_3'$.

Determined voltage beam-patterns 145' and 155' may now provide voltage in the $\theta_1$ azimuth direction. Therefore, $C_1$ should be recalculated using the last values obtained for $C_2$ and $C_3$ to provide determined voltage beam-pattern 135'.

Recalculating $C_1$ will change the portion of the determined voltage beam-pattern 135' in azimuth direction $\theta_2$. Additionally, determined voltage beam-pattern 155' provides some voltage in the $\theta_2$ azimuth direction. Therefore, $C_2$ should now be recalculated using the last values obtained for $C_1$ and $C_3$.

Recalculating $C_1$ and $C_2$ will change the portions of determined voltage beam-patterns 135' and 145' in the $\theta_3$ azimuth direction. Therefore, $C_3$ should now be recalculated using the last values obtained for $C_1$ and $C_2$.

This process of iteratively recalculating scaling factors $C_1$, $C_2$, and $C_3$ should continue until each of the three scaling factors converge. The scaling factors converge when the changes between the recalculated scaling factor and the last iteration of the scaling factor are small. For example, the scaling factors can be considered to have converged, when the total power of the composite voltage beam-pattern determined using the scaling factors is within 1% of the total power of the composite voltage beam-pattern determined using the last iteration of the scaling factors.

Returning to equations 15, 16, 17, 18, 19 and 20, there are two choices for each scaling factor; each scaling factor $C_1$, $C_2$, and $C_3$ can be zero or positive by solving equations 15, 17, and 19, respectively, or each scaling factor $C_1$, $C_2$, and $C_3$, can be zero or negative by solving equations 16, 18, and 20, respectively. Since there are two equations for each scaling factor there are eight combinations of the equations, which produce eight combinations of scaling factors.

|  |  | sign of the scaling factor: | | |
| --- | --- | --- | --- | --- |
|  |  | C1 is | C2 is | C3 is |
| combination 1: | equations 15, 17, and 19; | + | + | + |
| combination 2: | equations 15, 17, and 20; | + | + | − |
| combination 3: | equations 15, 18, and 19; | + | − | + |
| combination 4: | equations 15, 18, and 20; | + | − | − |
| combination 5: | equations 16, 17, and 19; | − | + | + |
| combination 6: | equations 16, 17, and 20; | − | + | − |

-continued

| | | sign of the scaling factor: | |
|---|---|---|---|
| | | C1 is | C2 is | C3 is |
| combination 7: and | equations 16, 18, and 19; | − | − | + |
| combination 8: | equations 16, 18, and 20. | − | − | − |

The shaping method was just described with combination 1. In the preferred embodiment, either the first four or the second four combinations are selected. Each of the four combinations is used to calculate its set of scaling factors in the same manner that was described above for combination 1. Each set of scaling factors is used to generate a composite beam-pattern. The power of the composite beam-pattern is calculated. The composite beam-pattern with the lowest power should be selected to be composite beam-pattern 175, shown in FIG. 5. Processor 523 can be used to calculate the combinations of scaling factors.

The reason only four of the combinations are used is now explained. Combination 1 will produce a set of scaling factors that have the same magnitude and opposite sign as the scaling factors produced by combination 8. Because these two sets of scaling factors have identical magnitudes and opposite signs, the magnitude of the sum of the weight vectors $Z_1$, $Z_2$ and $Z_3$ scaled by one set of these scaling factors will be equal to the magnitude of the sum of the weight vectors $Z_1$, $Z_2$ and $Z_3$ scaled by the other set of scaling factors. When the two sums are squared in order to obtain the power, the squares of the two sums will be identical. Therefore, the scaling factors produced by combinations 1 and 8 produce voltage beam-patterns having identical power, and therefore only one of these sets of scaling factors is needed in the consideration of which composite voltage beam-pattern has the lowest power.

Similarly, combination 2 will produce a set of scaling factors that have the same magnitude and opposite sign as the scaling factors produced by combination 7. Therefore, as explained above, only one of these sets of scaling factors needs to be used in considering which composite voltage beam-pattern has the lowest power. Likewise, combination 3 will produce a set of scaling factors that have the same magnitude and opposite sign as the scaling factors produced by combination 6, and combination 4 will produce a set of scaling factors that have the same magnitude and opposite sign of the scaling factors produced by combination 5.

The sequence of steps just described is the one way to determine the scaling factors $C_1$, $C_2$, and $C_3$. Another way to determine the scaling factors according to the above-described alternative embodiment of the present invention is now described. For ease of analysis this will be described with reference to two mobile terminals. When there are two mobile terminals, equations 15 through 18 become:

$$C_1 = \max(0, V_1 - [C_2 f(u_1 - u_2)]), \text{ or} \quad (21)$$

$$C_1 = \min(0, -V_1 - [C_2 f(u_1 - u_2)]), \quad (22)$$

similarly, equation 14 becomes:

$$C_2 = \max(0, V_2 - [C_1 f(u_2 - u_1)]), \text{ or} \quad (23)$$

$$C_2 = \min(0, -V_2 - [C_1 f(u_2 - u_1)]), \quad (24)$$

Because f(u) is an even function, so $f(u_1-u_2)=f(u_2-u_1)$. Therefore, once it is determined which of the two equations, 21 or 22 for $C_1$, and 23 or 24 for $C_2$, to select for each of the two scaling factors, then there are two equations in two variables $C_1$ and $C_2$, which can solved for $C_1$ and $C_2$. Selecting the equations to use is based on the type and amount of interference between the two EM fields to the two mobile terminals. The type and amount of interference can be determined from the magnitude of $f(u_1-u_2)$.

When $$0 \le f(u_1 - u_2) \le \frac{V_2}{V_1},$$

then equations 21 and 23 are used, so $$C_1 = V_1 - C_2 f(u_1 - u_2) \text{ and } C_2 = V_2 - C_1 f(u_1 - u_2).$$

Solving these two equations for $C_1$ and $C_2$ results in:

$$C_1 = V_1 \frac{1 - \frac{V_2}{V_1} f(u_1 - u_2)}{1 - [f(u_1 - u_2)]^2}$$

and $$C_2 = V_1 \frac{\frac{V_2}{V_1} - f(u_1 - u_2)}{1 - [f(u_1 - u_2)]^2}.$$

When $$\frac{V_2}{V_1} \le f(u_1 - u_2) \le 1,$$

then $C_1=V_1$, and $C_2=0$.

When $$-\frac{V_2}{V_1} \le f(u_1 - u_2) \le 0,$$

then equations 21 and 24 are used, so $$C_1 = V_1 - C_2 f(u_1 - u_2) \text{ and } C_2 = -V_2 - C_1 f(u_1 - u_2).$$

Solving these two equations for $C_1$ and $C_2$ results in:

$$C_1 = V_1 \frac{1 + \frac{V_2}{V_1} f(u_1 - u_2)}{1 - [f(u_1 - u_2)]^2}$$

and $$C_2 = -V_1 \frac{\frac{V_2}{V_1} + f(u_1 - u_2)}{1 - [f(u_1 - u_2)]^2}.$$

When $$f(u_1 - u_2) \le -\frac{V_2}{V_1},$$

then $C_1 = V_1$, and $C_2 = 0$.

Null-Filling Factor

Additionally, in a preferred embodiment, making composite weight vector $Z_5$ more robust can make the beam-pattern more robust. As shown in Equation 2 the weight vector is the transpose of the weights associated with each individual column of antenna elements, and as described in Equation 4, the composite weight vector is the sum of the scaled weight vectors of the individual voltage beam-patterns. Using Equations 2 and 4 the weights $Z_{51}, Z_{52}, \ldots Z_{5M}$ associated with each individual column of antenna elements to form the composite weight vector can be determined. Thus:

$$Z_5 = \text{the transpose of } [Z_{51}, Z_{52}, Z_{5M}] \quad (25).$$

Figure 14:
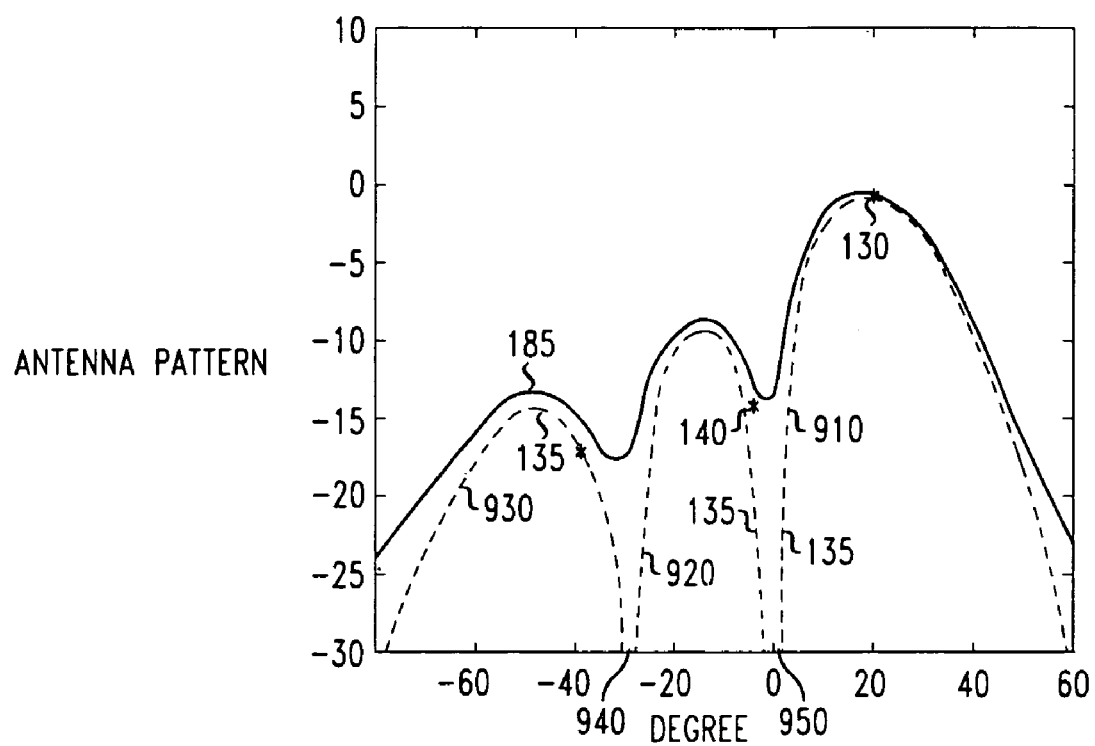
FIG. 14 shows a composite voltage beam-pattern produced using a weight vector, and of a composite voltage beam-pattern produced using a weight vector and a null-filling factor.

As discussed above, according to the shaping method one of voltage beam-patterns 135, 145, 155 is generated. FIG. 14 shows composite voltage beam-pattern 135 plotted in the Cartesian coordinate system. As can be seen in FIG. 14, when one of the voltage beam-patterns, for example voltage beam-pattern 135, is generated, the voltage beam-pattern has a large central lobe 910 and smaller side lobes 920 and 930, with null areas 940 and 950 between the lobes. The central lobe 910 is shaped and directed to mobile terminal 130. If a second mobile terminal, for example mobile terminal 140 is located in the central lobe or one of the side lobes of the beam-pattern 135, then composite beam-pattern 175 does not need additional voltage in the $\theta_2$ azimuth direction for the second mobile terminal to acceptably receive the signal and thus scaling factor $C_2$ is set to zero. Thus, determined voltage beam-pattern 145' would be set to zero, and composite beam-pattern 175 would be calculated with $C_2$ set to zero.

However, if mobile terminal 140 is close to the edge of a lobe this may lead to a problem. If mobile terminal 140 is located in one of the null areas, for example null area 950, close to the edge of a lobe, and the azimuth direction of mobile terminal 140 is obtained with even a slight error, the system may determine that mobile terminal 140 is located in the pattern of one of the lobes, in this case lobe 920. Therefore, the transmitter may determine that the phased-array antenna is generating a composite voltage beam-pattern that should carry a signal that is acceptably received by mobile terminal 140 when the signal is actually not acceptably received by mobile terminal 140.

To make a composite beam-pattern that is more robust against azimuth direction estimation errors a null-filling factor $\eta$ is added to weight vector $Z_5$ to produce weight vector $Z_6$. Adding null-filling factor $\eta$ to equation 25 produces equation 26.

$$Z_6 = \text{the transpose of} \left[ \frac{1}{\eta^{M-1}} Z_{51}, \frac{1}{\eta^{M-3}} Z_{52}, \ldots, \eta^{M-3} Z_{5(M-1)}, \eta^{M-1} Z_M \right]. \quad (26)$$

Weight vector $Z_6$ is then used to produce composite voltage beam-pattern 185. Null-filling factor $\eta$ can be any value that allows for reducing the nulls, yet does not increase the lobes significantly enough to eliminate the advantages of narrowing the beam-pattern that is provided by the phased-array antenna. Illustratively, null-filling factor $\eta$ can be between 0.8 and 1.2.

The foregoing is merely illustrative. Thus, for example, in the illustrative embodiment the method is described for three mobile terminals, in an alternative embodiment the method can be used for any number of mobile terminals equal to or greater than two.

Furthermore, in the illustrative embodiment the voltage beam-patterns are generated using the normalized voltages. In alternative embodiments the voltage beam-patterns can be generated without normalizing the voltages. In this case, each of the voltage beam-patterns may be determined with voltages induced at different distances from the phased-array antenna. This should be taken into consideration when calculating the magnitude of the voltage provided at the location of a mobile terminal by a voltage beam-pattern that is directed to another mobile terminal. For example, the magnitude of voltage that a first voltage beam-pattern (corresponding to a first mobile terminal) provides in the second azimuth direction (the azimuth direction of a second mobile terminal) should be the magnitude of voltage that is induced by the EM field corresponding to the first voltage beam-pattern in the second azimuth direction at the distance of the second mobile terminal from the phased-array antenna.

Moreover, although in the illustrative embodiment the magnitudes of the voltages are normalized to r=30 meters, in alternative embodiments r can be set to any distance, and the magnitudes of the voltages would then be normalized to the voltage that would be induced at that distance from the phased-array antenna.

Additionally, one skilled in the art will recognize that although in the illustrative embodiment each cell is divided into three 120° sectors, the cells can be divided into any number of sectors of any acceptable size, or the cells can be omni-sectored, in which case each cell has one 360° sector.

Furthermore, although in the illustrative embodiment processor 523 is shown in FIG. 5 as being located transmitter 522, in alternative embodiments of the invention, processor 523 can be located anywhere in the wireless communication system, for example, in different a portion of base station 112, or in the MSC.

Moreover, although in the illustrative embodiment the present invention is performed using EM field that are focused in a particular azimuth direction, in alternative embodiments the invention can be implemented using EM fields that are focused in other directions, for example the elevation direction.

While the invention has been described with reference to a preferred embodiment, it will be understood by those skilled in the art having reference to the specification and drawings that various modifications may be made and various alternatives are possible therein without departing from the spirit and scope of the invention.

We claim:

1. A method for generating a composite EM field to carry a signal to at least two terminals, the method comprising the step of directing energy in a plurality of directions, the amount of energy directed in the direction of each of the terminals being a function of the locations and acceptable receive strengths of at least two of the terminals, wherein the direction is an azimuth direction, wherein an acceptable receive strength for a terminal comprises an electromagnetic (EM) field strength at least as large as, but not significantly larger than, the EM field strengths needed for that terminal to receive the signal carried by the EM field; wherein
the directing step comprises the steps of:
determining for each one of the terminals an EM field that would have to be generated for the one terminal in order to provide an acceptable receive strength thereat, the determining taking into account the strength, at the location of the one terminal, of EM fields previously determined for others of the terminals;
repeating the first determining step until the EM fields determined for the at least two of the terminals provide an EM field strength for each of the at least two of the terminals that is substantially equal to its adequate receive strength; and
determining the amount of energy to be directed in the direction of each of the terminals based on the EM fields thus determined.

2. The method of claim 1, wherein:
each EM field being represented by one of a plurality of beam-patterns;
the first determining step comprises determining for each one of the terminals a beam pattern that would have to be generated for the one terminal in order to provide an acceptable receive strength thereat, the determining taking into account the EM field strength, at the location of the one terminal, of beam-patterns previously determined for others of the terminals; and
the repeating step comprises repeating the first determining step until the beam-patterns determined for the at least two of the terminals provide an EM field strength for each of the at least two of the terminals that is substantially equal to its adequate receive strength.

3. The method of claim 2, wherein:
the beam-patterns being voltage beam patterns;
the acceptable receive strength being an acceptable receive voltage; and
the adequate receive strength being an adequate receive voltage.

4. The method of claim 2, wherein one of a plurality of weight vectors corresponds to each of the beam-patterns, and the second determining step comprises the steps of:
determining a composite weight vector using the plurality of weight vectors, and a null-filling factor;
determining a composite beam-pattern using the composite weight vector, the composite beam-pattern representing the composite EM field; and
determining the amount of energy to be directed in the direction of each of the terminals based on the composite EM field.

5. The method of claim 1, further comprising the step of transmitting the energy.

6. A method for generating a composite EM field to carry a signal to at least two terminals, the method comprising the step of directing energy in a plurality of directions, the amount of energy directed in the direction of each of the terminals being a function of the locations and acceptable receive strengths of at least two of the terminals, wherein the direction is an azimuth direction, wherein an acceptable receive strength for a terminal comprises an electromagnetic (EM) field strength at least as large as, but not significantly larger than, the EM field strengths needed for that terminal to receive the signal carried by the EM field;
wherein the directing step comprises the steps of:
determining for each one of the terminals an EM field that would have to be generated for the one terminal in order to provide an acceptable receive strength thereat if that one terminal was the only terminal that needed to receive the signal;
determining a scaling factor for each EM field such that each EM field, associated with the at least two terminals, scaled by its scaling factor provides an EM field strength at the location of each of these at least two terminals that is substantially equal to its adequate receive strength;
scaling each EM field, associated with the at least two terminals, by its scaling factor; and
determining the amount of energy to be directed in the direction of each of the terminals based on the EM fields thus determined.

7. A transmitter operable to generate a composite EM field to carry a signal to at least two terminals by directing energy in a plurality of directions, the amount of energy directed in the direction of each of the terminals being a function of the locations and acceptable receive strengths of at least two of the terminals, wherein the direction is an azimuth direction, wherein an acceptable receive strength for a terminal comprises an electromagnetic (EM) field strength at least as large as, but not significantly larger than, the EM field strengths needed for that terminal to receive the signal carried by the EM field;
the transmitter further comprising a processor having a first mode of operation to:
determine for each one of the terminals an EM field that would have to be generated for the one terminal in order to provide an acceptable receive strength thereat, the determining taking into account the strength, at the location of the one terminal, of EM fields previously determined for others of the terminals;
repeat the first determining until the EM fields determined for the at least two of the terminals provide an EM field strength for each of the at least two of the terminals that is substantially equal to its adequate receive strength; and
determine the amount of energy to be directed in the direction of each of the terminals based on the EM fields thus determined.

8. The transmitter of claim 7, wherein:
each EM field being represented by one of a plurality of beam-patterns;
the first determining comprises determining for each one of the terminals a beam pattern that would have to be generated for the one terminal in order to provide an acceptable receive strength thereat, the determining taking into account the EM field strength, at the location of the one terminal, of beam-patterns previously determined for others of the terminals; and
the repeating comprises repeating the first determining until the beam-patterns determined for the at least two of the terminals provide an EM field strength for each of the at least two of the terminals that is substantially equal to its adequate receive strength.

9. The transmitter of claim 8, wherein:
the beam-patterns being voltage beam patterns;
the acceptable receive strength being an acceptable receive voltage; and
the adequate receive strength being an adequate receive voltage.

10. The transmitter of claim 8, wherein one of a plurality of weight vectors corresponds to each of the beam-patterns, and the second determining comprises:
determining a composite weight vector using the plurality of weight vectors, and a null-filling factor;

determining a composite beam-pattern using the composite weight vector, the composite beam-pattern representing the composite EM field; and determining the amount of energy to be directed in the direction of each of the terminals based on the composite EM field.

11. The transmitter of claim 7, wherein the processor operates in only one of the first mode of operation and a second mode of operation, in the second mode of operation the processor operable to:

determine for each one of the terminals an EM field that would have to be generated for the one terminal in order to provide an acceptable receive strength thereat if that one terminal was the only terminal that needed to receive the signal;

determine a scaling factor for each EM field such that each EM field, associated with the at least two terminals, scaled by its scaling factor provides an EM field strength at the location of each of these at least two terminals that is substantially equal to its adequate receive strength;

scale each EM field, associated with the at least two terminals, by its scaling factor; and determine the amount of energy to be directed in the direction of each of the terminals based on the EM fields thus determined.

12. A system comprising a transmitter operable to generate a composite electromagnetic (EM) field to carry a signal to at least two terminals by directing energy in a plurality of directions, the amount of energy directed in the direction of each of the terminals being a function of the locations and acceptable receive strengths of at least two of the terminals, wherein the direction is an azimuth direction, wherein an acceptable receive strength for a terminal comprises an EM field strength at least as large as, but not significantly larger than, the EM field strength needed for that terminal to receive the signal carried by the EM field, the system further comprising a processor coupled to the transmitter, the processor operable to:

determine for each one of the terminals an EM field that would have to be generated for the one terminal in order to provide an acceptable receive strength thereat, the determining taking into account the strength, at the location of the one terminal, of EM fields previously determined for others of the terminals;

repeat the first determining until the EM fields determined for the at least two of the terminals provide an EM field strength for each of the at least two of the terminals that is substantially equal to its adequate receive strength; and determine the amount of energy to be directed in the direction of each of the terminals based on the EM fields thus determined.

13. The system of claim 12, wherein the processor being located in the transmitter.

14. The system of claim 12, wherein the system is a wireless communication system having at least one mobile switching center (MSC), and the processor being located in the MSC.

15. The system of claim 12, wherein:

each EM field being represented by one of a plurality of beam-patterns;

the first determining comprises determining for each one of the terminals a beam pattern that would have to be generated for the one terminal in order to provide an acceptable receive strength thereat, the determining taking into account the EM field strength, at the location of the one terminal, of beam-patterns previously determined for others of the terminals; and the repeating comprises repeating the first determining until the beam-patterns determined for the at least two of the terminals provide an EM field strength for each of the at least two of the terminals that is substantially equal to its adequate receive strength.

16. The system of claim 15, wherein:

the beam-patterns being voltage beam patterns;

the acceptable receive strength being an acceptable receive voltage; and the adequate receive strength being an adequate receive voltage.

17. The system of claim 15, wherein one of a plurality of weight vectors corresponds to each of the beam-patterns, and the second determining comprises:

determining a composite weight vector using the plurality of weight vectors, and a null-filling factor;

determining a composite beam-pattern using the composite weight vector, the composite beam-pattern representing the composite EM field; and determining the amount of energy to be directed in the direction of each of the terminals based on the composite EM field.

18. A system comprising a transmitter operable to generate a composite electromagnetic (EM) field to carry a signal to at least two terminals by directing energy in a plurality of directions, the amount of energy directed in the direction of each of the terminals being a function of the locations and acceptable receive strengths of at least two of the terminals, wherein the direction is an azimuth direction, wherein an acceptable receive strength for a terminal comprises an EM field strength at least as large as, but not significantly larger than, the EM field strength needed for that terminal to receive the signal carried by the EM field, the system further comprising a processor coupled to the transmitter, the processor operable to:

determine for each one of the terminals an EM field that would have to be generated for the one terminal in order to provide an acceptable receive strength thereat if that one terminal was the only terminal that is needed to receive the signal;

determine a scaling factor for each EM field such that each EM field, associated with the at least two terminals, scaled by its scaling factor provides an EM field strength at the location of each of these at least two terminals that is substantially equal to its adequate receive strength;

scale each EM field, associated with the at least two terminals, by its scaling factor; and determine the amount of energy to be directed in the direction of each of the terminals based on the EM fields thus determined.

* * * * *